United States Patent
Kuhara

(10) Patent No.: US 11,551,559 B2
(45) Date of Patent: Jan. 10, 2023

(54) DRONE, METHOD FOR CONTROLLING FLIGHT, AND RECORDING MEDIUM STORING PROGRAM

(71) Applicant: PANASONIC INTELLECTUAL PROPERTY CORPORATION OF AMERICA, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1008 days.

(21) Appl. No.: 16/249,215

(22) Filed: Jan. 16, 2019

(65) Prior Publication Data
US 2019/0156683 A1 May 23, 2019

Related U.S. Application Data

(63) Continuation of application No. 15/730,884, filed on Oct. 12, 2017, now Pat. No. 10,223,923, which is a
(Continued)

(30) Foreign Application Priority Data

Oct. 27, 2015 (JP) .............................. JP2015-210330
Jun. 22, 2016 (JP) .............................. JP2016-123242

(51) Int. Cl.
*G08G 5/00* (2006.01)
*G05D 1/02* (2020.01)
(Continued)

(52) U.S. Cl.
CPC ......... *G08G 5/0039* (2013.01); *G05D 1/0011* (2013.01); *G05D 1/0202* (2013.01);
(Continued)

(58) Field of Classification Search
CPC .. G08G 5/0039; G08G 5/0013; G08G 5/0034; G08G 5/0056; G08G 5/006;
(Continued)

(56) References Cited

U.S. PATENT DOCUMENTS

| | | | | |
|---|---|---|---|---|
| 6,064,939 A | * | 5/2000 | Nishida | G08G 5/025 |
| | | | | 244/175 |
| 6,868,320 B1 | * | 3/2005 | Burch | G01C 23/00 |
| | | | | 701/14 |

(Continued)

FOREIGN PATENT DOCUMENTS

| JP | 2006-143193 A | 6/2006 |
|---|---|---|
| WO | 2012/096282 A1 | 7/2012 |

OTHER PUBLICATIONS

International Search Report, dated Aug. 9, 2016, in International Application No. PCT/JP2016/003142.

*Primary Examiner* — Tuan C To
*Assistant Examiner* — Dominick Mulder
(74) *Attorney, Agent, or Firm* — Greenblum & Bernstein, P.L.C.

(57) ABSTRACT

A drone is provided that includes a controller, a time measurer that measures a present time, a position measurer that obtains a current position of the drone, and a storage that stores a time period for which the flight of the drone is permitted. The controller performs operations including determining a possible flight area of the drone in accordance with a difference between an end of the time period for which flight of the drone is permitted and the present time, and determining whether the drone is located within the possible flight area on the basis of the current position of the drone.

12 Claims, 17 Drawing Sheets

Related U.S. Application Data continuation of application No. PCT/JP2016/003142, filed on Jun. 30, 2016.

(60) Provisional application No. 62/193,680, filed on Jul. 17, 2015.

(51) Int. Cl.
*G05D 1/00* (2006.01)
*G05D 1/10* (2006.01)

(52) U.S. Cl.
CPC ............ *G05D 1/106* (2019.05); *G08G 5/006* (2013.01); *G08G 5/0013* (2013.01); *G08G 5/0034* (2013.01); *G08G 5/0056* (2013.01); *G08G 5/0069* (2013.01); *G08G 5/0073* (2013.01); *G08G 5/0091* (2013.01)

(58) Field of Classification Search
CPC .. G08G 5/0069; G08G 5/0073; G08G 5/0091; G05D 1/0011; G05D 1/0202; G05D 1/106; G05D 1/0016; G05D 1/0022; B64C 39/024; B64C 2201/108; B64C 2201/146

See application file for complete search history.

(56) References Cited

U.S. PATENT DOCUMENTS

| | | | |
|---|---|---|---|
| 9,821,910 B1* | 11/2017 | Suiter | G01S 19/48 |
| 2006/0106506 A1 | 5/2006 | Nichols et al. | |
| 2007/0129973 A1* | 6/2007 | Wollenberg | G06Q 10/10 |
| | | | 705/5 |
| 2009/0322567 A1 | 12/2009 | Stock et al. | |
| 2012/0310530 A1* | 12/2012 | Lee | G01C 21/3697 |
| | | | 701/465 |
| 2013/0124089 A1* | 5/2013 | Herman | G01C 21/20 |
| | | | 701/528 |
| 2014/0129055 A1 | 5/2014 | Mach et al. | |
| 2015/0254988 A1 | 9/2015 | Wang et al. | |
| 2015/0301151 A1* | 10/2015 | Spiegel | G01S 5/18 |
| | | | 368/14 |
| 2015/0323930 A1 | 11/2015 | Downey et al. | |
| 2015/0332490 A1* | 11/2015 | Coulmeau | B64D 43/00 |
| | | | 701/3 |
| 2016/0059962 A1* | 3/2016 | Abuelsaad | G08G 1/166 |
| | | | 701/3 |
| 2016/0140851 A1* | 5/2016 | Levy | G08G 5/0034 |
| | | | 701/410 |
| 2016/0189549 A1* | 6/2016 | Marcus | G08G 5/0008 |
| | | | 701/3 |
| 2016/0253907 A1* | 9/2016 | Taveira | G05D 1/106 |
| | | | 701/3 |
| 2016/0321503 A1* | 11/2016 | Zhou | G06V 20/176 |
| 2017/0076610 A1* | 3/2017 | Liu | G08G 5/0069 |

* cited by examiner

| TIME | FLIGHT POSSIBLE AREA (FLIGHT POSSIBLE DISTANCE) |
|---|---|
| 30 MINUTES BEFORE SUNSET TO 20 MINUTES BEFORE SUNSET | 50 m |
| 20 MINUTES BEFORE SUNSET TO 15 MINUTES BEFORE SUNSET | 40 m |
| 15 MINUTES BEFORE SUNSET TO 10 MINUTES BEFORE SUNSET | 30 m |
| 10 MINUTES BEFORE SUNSET TO 5 MINUTES BEFORE SUNSET | 20 m |
| 5 MINUTES BEFORE SUNSET TO SUNSET | 10 m |

# DRONE, METHOD FOR CONTROLLING FLIGHT, AND RECORDING MEDIUM STORING PROGRAM

CROSS-REFERENCE TO RELATED APPLICATION

This is a continuation of U.S. patent application Ser. No. 15/730,884, filed Oct. 12, 2017, which is a continuation of U.S. National Stage International Application No. PCT/JP2016/003142, filed Jun. 30, 2016, which claims the benefit of U.S. Provisional Patent Application No. 62/193,680, Filed Jul. 17, 2015, as well as priority to Japanese Application Nos. 2016-123242 filed Jun. 22, 2016 and 2015-210330 filed Oct. 27, 2015. The entire disclosure of each of the above-identified applications, including the specification, drawings, and claims, is incorporated herein by reference in its entirety.

1. Technical Field

The present disclosure relates to a drone flown by remote control, a method for controlling the flight of the drone flown by remote control, and a recording medium storing a program.

2. Description of the Related Art

Small drones remotely controlled by remote controllers are gaining in popularity. Such a drone includes a plurality of propellers and freely flies through the air by controlling rotational speeds of the plurality of propellers.

Since drones can freely fly through the air, various regulations on the flight of drones are being examined.

International Publication No. 2012/096282, for example, discloses a controller that receives specification of a movement permission area of a model device, determines, after receiving a command for moving the model device, whether the model device will go out of the movement permission area as a result of the command on the basis of a position of the model device, and transmits, if the model device will not go out of the movement permission area, the command to the model device through a communication interface or does not transmit, if the model device will go out of the movement permission area, the command to the model device.

In addition, regulations that ban the flight of drones at night and permit the flight of drones only in daytime are being examined.

SUMMARY

The above example of the related art, however, require further improvements.

In one general aspect, the techniques disclosed here feature a drone including a controller, a communicator that communicates with a controller used to remotely control the drone, a time measurer that measures present time, a position measurer that obtains a current position of the drone, and a storage that stores a current position of the controller obtained through the communicator and
a time period for which the flight of the drone is permitted. The controller performs operations including determining a flight possible area of the drone in accordance with a difference between an end of the time period for which flight of the drone is permitted and the present time, and determining whether the drone is located within the flight possible area on the basis of a distance between the current position of the drone and the current position of the controller.

According to the present disclosure, since a flight possible area of a drone is determined in accordance with a difference between an end of a time period for which the flight of the drone is permitted and a present time, the drone can return before the end of the time period for which the flight of the drone is permitted.

It should be noted that this general or specific aspect may be implemented as an apparatus, a system, an integrated circuit, a computer program, a computer-readable storage medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
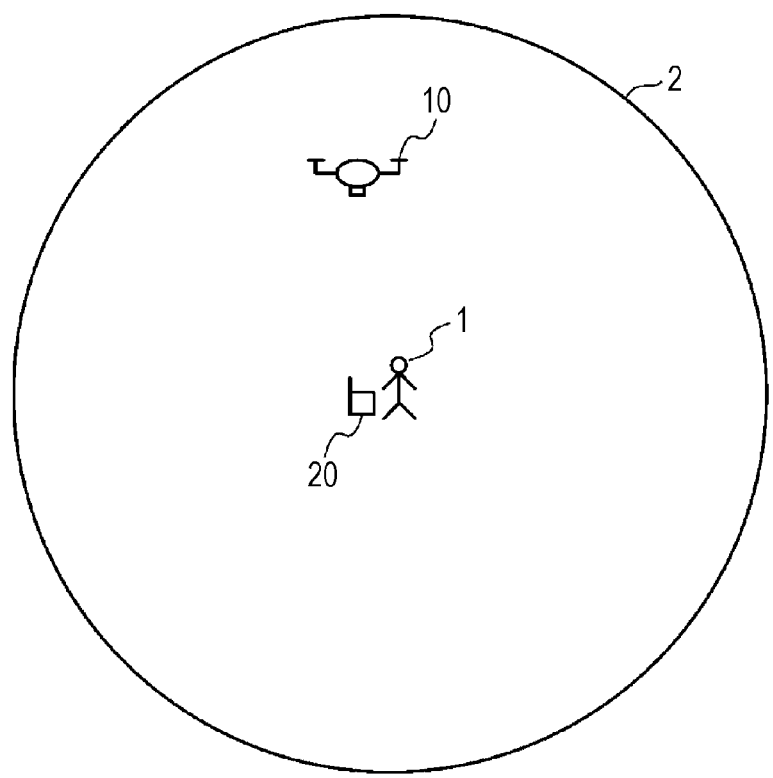
FIG. 1 is a diagram illustrating the configuration of a flight control system according to a first embodiment of the present disclosure.

Underlying Knowledge Forming Basis of Present Disclosure

When the flight of a drone is permitted until sunset, for example, an operator might instruct the drone to return thereto before sunset but the drone might not be able to return before sunset depending on a position thereof at the time of the instruction.

In view of the above examination, the present inventor has conceived aspects of the present disclosure.

A drone according to an aspect of the present disclosure is a drone including a controller, a communicator that communicates with a control device used to remotely control the drone, a time measurer that measures present time, a position measurer that obtains a current position of the drone, and a storage that stores a current position of the control device obtained through the communicator and a time period for which the flight of the drone is permitted. The controller performs operations includes determining a flight possible area of the drone in accordance with a difference between an end of the time period for which flight of the drone is permitted and the present time, and determining whether the drone is located within the flight possible area on the basis of a distance between the current position of the drone and the current position of the control device.

With this configuration, the flight possible area of the drone is determined in accordance with the difference between the end of the time period for which the flight of the drone is permitted and the present time, and whether the drone is located within the flight possible area is determined on the basis of the distance between the current position of the drone and the current position of the control device.

Since the flight possible area of the drone is determined in accordance with the difference between the end of the time period for which the flight of the drone is permitted and the present time, the drone can return before the end of the time period for which the flight of the drone is permitted.

In addition, in the drone, the operations may further include sequentially reducing the flight possible area as time elapses.

With this configuration, the flight possible area is sequentially reduced as time elapses, and the drone can certainly return before the end of the time period for which the flight of the drone is permitted.

In addition, in the drone, the operations may further include automatically moving, if it is determined that the drone is located outside the flight possible area, the drone toward the control device.

With this configuration, if it is determined that the drone is located outside the flight possible area, the drone is automatically moved toward the control device, and the drone can be automatically moved into the flight possible area.

In addition, in the drone, the operations may further include rejecting, if it is determined that the drone is located outside the flight possible area, an operation other than the operation for automatically moving the drone toward the control device.

With this configuration, if it is determined that the drone is located outside the flight possible area, an operation other than the operation for automatically moving the drone toward the control device is not received, and the drone can be guided into the flight possible area.

In addition, in the drone, the operations may further include notifying, before the flight possible area is determined, the control device that the flight possible area is to be determined.

With this configuration, since the control device is notified, before the flight possible area is determined, that the flight possible area is to be determined, the operator can be notified in advance that the flight possible area is to be determined, and the operator can be prompted to move the drone into the flight possible area before the flight possible area is determined.

In addition, in the drone, the flight possible area may include a first flight possible based on a position of the control device and a second flight possible area based on a position of a communication terminal carried by an observer who monitors the drone. The operations may further include determining the first and second flight possible areas in accordance with the difference between the end of the time period for which the flight of the drone is permitted and the present time.

With this configuration, the flight possible area includes the first flight possible area based on the position of the control device and the second flight possible area based on the position of the communication terminal carried by the observer who monitors the drone. The first and second flight possible areas are determined in accordance with the difference between the end of the time period for which the flight of the drone is permitted and the present time.

Since, if there is an observer who monitors the drone along with the operator, the second flight possible area based on the position of the communication terminal operated by the observer is determined along with the first flight possible area based on the position of the control device, the drone can return to the control device or the communication terminal before the end of the time period for which the flight of the drone is permitted.

In addition, in the drone, the operations may further include estimating, before the first and second flight possible areas are determined, whether the drone is located outside the first and second flight possible areas, and transmitting, if it is estimated that the drone is located outside the first and second flight possible areas, guidance information for guiding the drone into the first or second flight possible area to the control device or the communication terminal.

With this configuration, it is estimated, before the first and second flight possible areas are determined, whether the drone is located outside the first and second flight possible areas. If it is estimated that the drone is located outside the first and second flight possible areas, the guidance information for guiding the drone into the first or second flight possible area is transmitted to the control device or the communication terminal.

The drone, therefore, can be moved into the first or second flight possible area before the first and second flight possible areas are determined.

In addition, in the drone, the operations may further include changing, in accordance with a distance between the control device and the drone, a time at which the guidance information is transmitted.

With this configuration, since the time at which the guidance information is transmitted is changed in accordance with the distance between the control device and the drone, the drone can certainly return to the control device by, for example, transmitting the guidance information earlier as the distance between the control device and the drone becomes larger.

In addition, in the drone, before the first and second flight possible areas are determined, movement area information indicating whether the drone is to be moved into the first or second flight possible area may be stored in the storage. The operations may further include automatically moving, if the drone is not located within the first or second flight possible area indicated by the movement area information when the first and second flight possible areas are actually determined, the drone toward the first or second flight possible area indicated by the movement area information.

With this configuration, before the first and second flight possible areas are determined, the movement area information indicating whether the drone is to be moved into the first or second flight possible area is stored in the storage. If the drone is not located within the first or second flight possible area indicated by the movement area information when the first and second flight possible areas are actually determined, the drone is automatically moved toward the first or second flight possible area indicated by the movement area information.

Whether the drone is to be moved into the first or second flight possible area, therefore, can be determined before the first and second flight possible areas are determined, and the drone can automatically return to a predetermined position.

In addition, in the drone, the operations may further include reducing only the first or second flight possible area indicated by the movement area information as time elapses.

With this configuration, only the first or second flight possible area indicated by the movement area information is reduced as time elapses, the other flight possible area that is not indicated by the movement area information is not unnecessarily reduced.

In addition, in the drone, the operations may further include automatically moving, if it is determined that the drone is located outside the first and second flight possible areas when the first and second flight possible areas are determined, the drone toward the control device or the communication terminal, whichever is closer to the drone.

With this configuration, if it is determined that the drone is located outside the first and second flight possible areas when the first and second flight possible areas are determined, the drone is automatically moved toward the control device or the communication terminal, whichever is closer to the drone.

If it is determined that the drone is located outside the first and second flight possible areas when the first and second flight possible areas are determined, the drone can be certainly moved toward the control device or the communication terminal.

In addition, in the drone, movement area information indicating whether the drone is to be moved into the first or second flight possible area may be stored in the storage before the first and second flight possible areas are determined. The operations may further include controlling, if it is determined that the drone is located in an area different from the area indicated by the movement area information when the first and second flight possible area are actually determined, the drone such that the drone flies within the area within which the drone is currently located.

With this configuration, the movement area information indicating whether the drone is to be moved into the first or second flight possible area is stored in the storage before the first and second flight possible areas are determined. If it is determined that the drone is located in an area different from the area indicated by the movement area information when the first and second flight possible area are actually determined, the drone is controlled such that the drone flies within the area within which the drone is currently located.

Since the drone is controlled such that the drone flies within the area within which the drone is currently located even if whether the drone is to be moved into the first or second flight possible area is determined before the first and second flight possible areas are determined, the drone can be certainly moved toward the control device or the communication terminal before the end of the time period.

A method for controlling flight according to another aspect of the present disclosure is a method for controlling flight of a drone flown by remote control. The method includes communicating various pieces of information with a control device used to remotely control the drone, obtaining present time, a time period for which the flight of the drone is permitted, and a current position of the drone, determining a flight possible area of the drone in accordance with a difference between an end of the time period for which the flight of the drone is permitted and the present time, and determining whether the drone is located within the flight possible area on the basis of a distance between the current position of the drone and a current position of the control device.

With this configuration, the present time is obtained, the flight possible area of the drone is determined in accordance with the difference between the end of the time period for which the flight of the drone is permitted and the present time, and whether the drone is located within the flight possible area is determined on the basis of the distance between the current position of the drone and the current position of the control device.

Since the flight possible area of the drone is determined in accordance with the difference between the end of the time period for which the flight of the drone is permitted and the present time, the drone can return before the end of the time period for which the flight of the drone is permitted.

A computer-readable non-transitory recording medium according to another aspect of the present disclosure is a computer-readable non-transitory recording medium storing a program for controlling flight of a drone flown by remote control. The program causes, when executed by a computer, the computer to perform operations including determining a flight possible area of the drone in accordance with a difference between an end of a time period for which the flight of the drone is permitted and a present time, and determining whether the drone is located within the flight possible area on the basis of a distance between a current position of the drone and a current position of a control device used to remotely control the drone.

With this configuration, the present time is obtained, the flight possible area of the drone is determined in accordance with the difference between the end of the time period for which the flight of the drone is permitted and the present time, and whether the drone is located within the flight possible area is determined on the basis of the distance between the current position of the drone and the current position of the control device.

Since the flight possible area of the drone is determined in accordance with the difference between the end of the time period for which the flight of the drone is permitted and the present time, the drone can return before the end of the time period for which the flight of the drone is permitted.

In addition, in the computer-readable non-transitory recording medium, the operations may further include moving, if it is determined that the drone is located outside the flight possible area, the drone toward the control device.

With this configuration, if it is determined that the drone is located outside the flight possible area, the drone is moved toward the control device, and the drone can be automatically moved into the flight possible area.

Embodiments of the present disclosure will be described hereinafter with reference to the accompanying drawings. The following embodiments are specific examples of the present disclosure and do not limit the technical scope of the present disclosure.

First Embodiment

FIG. 1 is a diagram illustrating the configuration of a flight control system according to a first embodiment of the present disclosure. The flight control system illustrated in FIG. 1 includes a drone 10 and a controller 20.

An operator 1 uses the controller 20 to operate the drone 10 remotely. The controller 20 wirelessly transmits, for example, an operation command for operating the drone 10.

The drone 10 is flown by remote control. The drone 10 receives an operation command from the controller 20 and flies on the basis of the received operation command.

Figure 2:
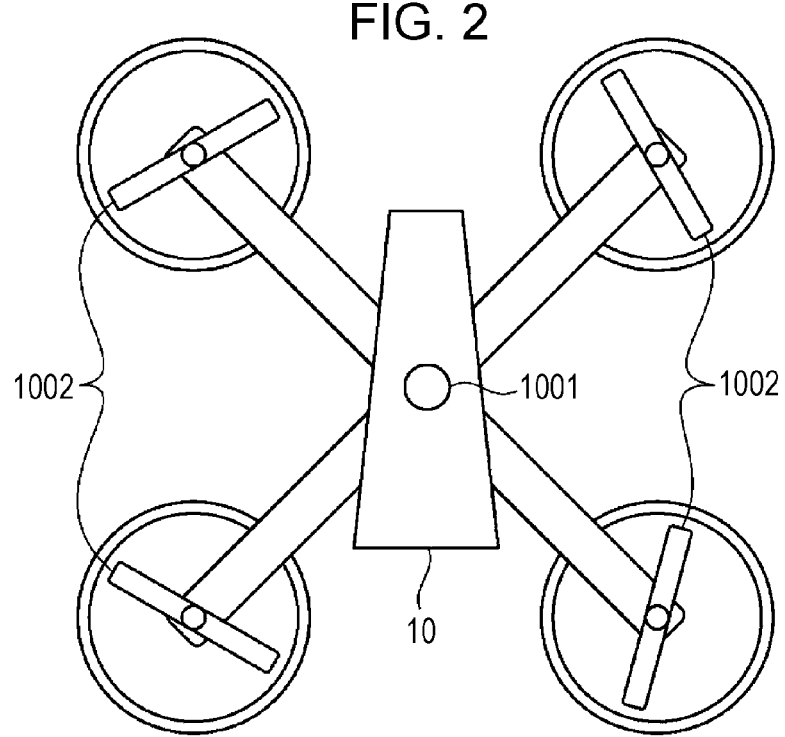
FIG. 2 is a general diagram illustrating an example of a drone according to the first embodiment of the present disclosure.
Figure 3:
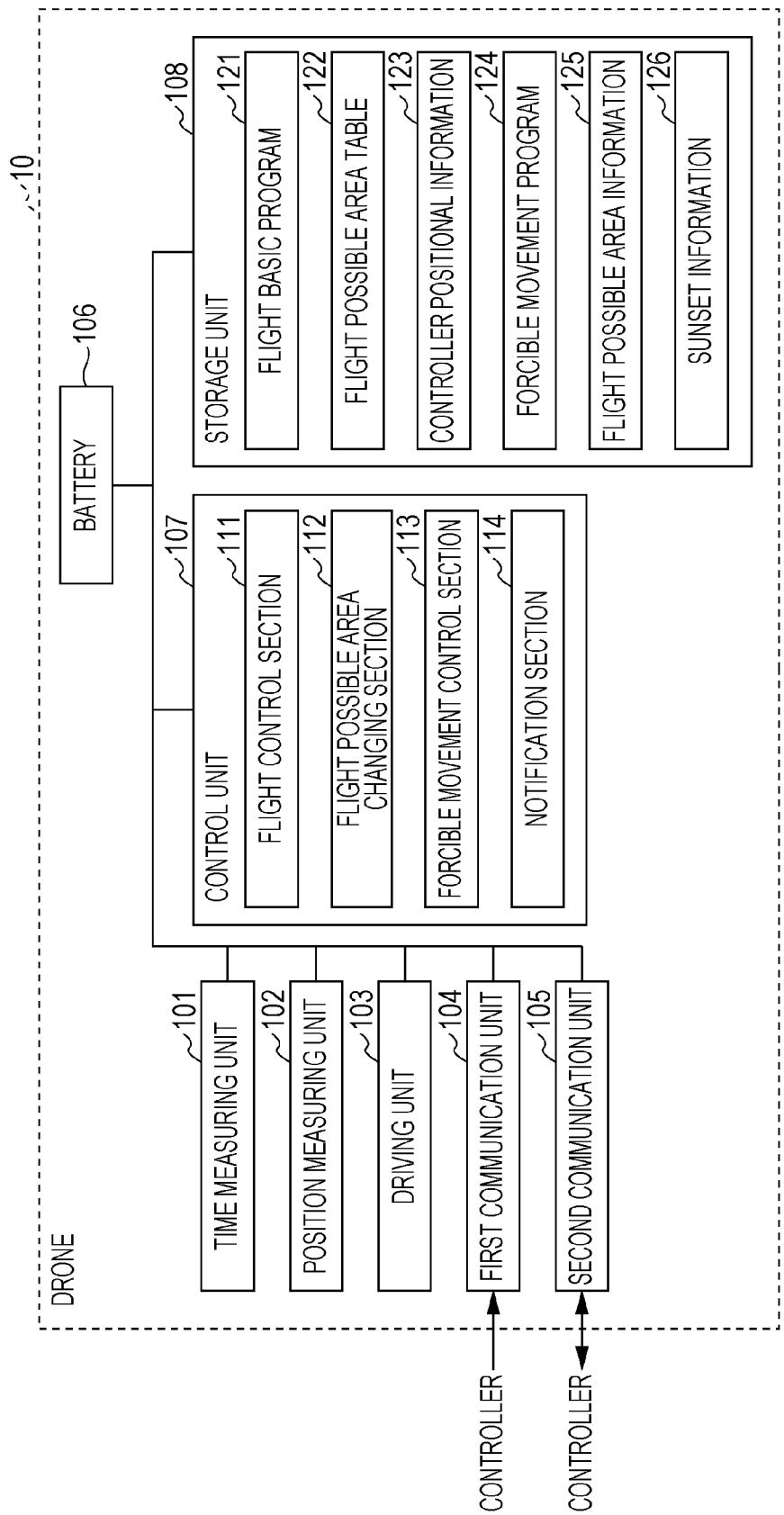
FIG. 3 is a block diagram illustrating the configuration of the drone according to the first embodiment of the present disclosure.

FIG. 2 is a general diagram illustrating an example of the drone 10 according to the first embodiment of the present disclosure. FIG. 3 is a block diagram illustrating the configuration of the drone 10 according to the first embodiment of the present disclosure.

As illustrated in FIG. 2, the drone 10 at least includes various sensors 1001 and propulsion units 1002. The drone 10 stores a time measuring unit 101, a position measuring unit 102, a driving unit 103, a first communication unit 104, a second communication unit 105, a battery 106, a control unit 107, and a storage unit 108.

The various sensors 1001 are an image sensor and human detection sensor, for example, and any sensors may be mounted in accordance with the usage of the drone 10.

The propulsion units 1002 each include a propeller for producing lift, thrust, and torque for flying the drone 10 and a motor for rotating the propeller. In the example illustrated in FIG. 2, the drone 10 includes four propulsion units 1002, but the number of propulsion units 1002 may be five or more.

The time measuring unit 101 measures time and obtains present time. The position measuring unit 102 is a global positioning system (GPS), for example, and obtains a current position of the drone 10. The current position of the drone 10 is represented by latitude, longitude, and altitude.

The driving unit 103 drives the propulsion units 1002 for flying the drone 10. The driving unit 103 rotates the propellers for flying the drone 10.

The first communication unit 104 receives an operation command from the controller 20, for example, through specified low-power radio communication. The second communication unit 105 transmits various pieces of information to the controller 20 and receives various pieces of information from the controller 20 through a communication standard such as long-term evolution (LTE).

The battery 106 is a power supply of the drone 10 and supplies power to the components of the drone 10. The drone 10 need not include a battery, and a battery provided outside the drone 10 may supply power to the drone 10, instead.

The control unit 107 is a central processing unit (CPU) and controls the operation of the drone 10. The control unit 107 includes a flight control section 111, a flight possible area changing section 112, a forcible movement control section 113, and a notification section 114.

The storage unit 108 is a semiconductor memory, for example, and stores various pieces of information. The storage unit 108 stores a flight basic program 121, a flight possible area table 122, controller positional information 123, a forcible movement program 124, flight possible area information 125, sunset information 126.

The flight basic program 121 is used to control the flight of the drone 10. The flight control section 111 executes the flight basic program 121 to control the flight of the drone 10.

The flight possible area table 122 is a table in which certain time periods before sunset and flight possible areas (flight possible distances) are associated with each other.

Figures 4, 5:
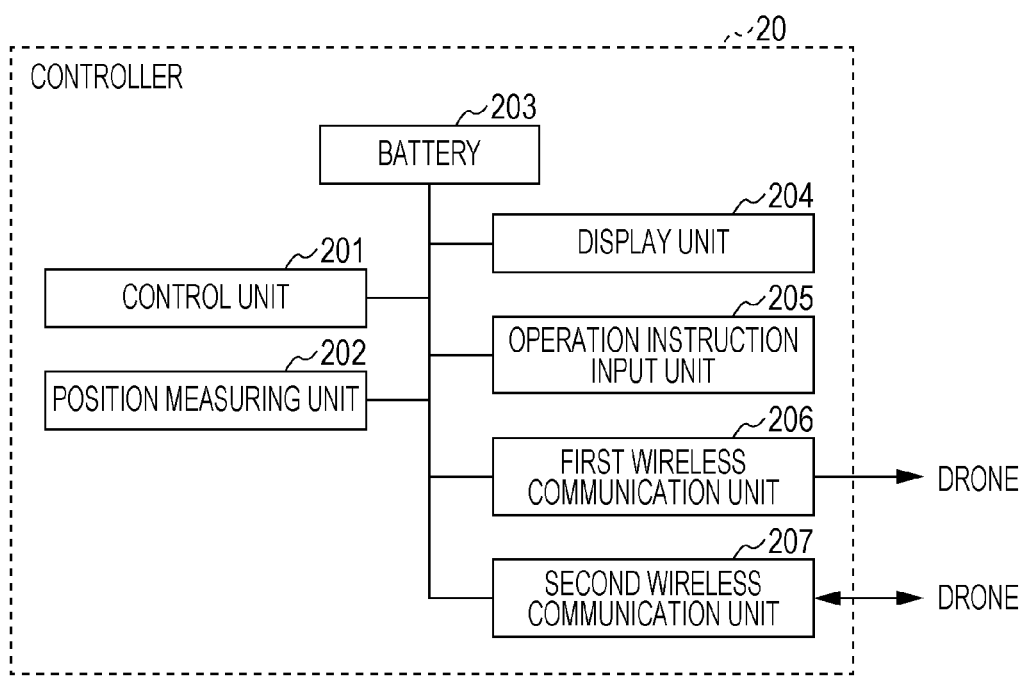
FIG. 4 is a diagram illustrating an example of a flight possible area table according to the first embodiment.
FIG. 5 is a block diagram illustrating the configuration of a controller according to the first embodiment of the present disclosure.

FIG. 4 is a diagram illustrating an example of the flight possible area table 122 according to the first embodiment. As illustrated in FIG. 4, a time period from 30 minutes to 20 minutes before sunset is associated with a flight possible area of 50 m. A flight possible area refers to a distance from the controller 20 within which the drone 10 may move. A time period from 20 minutes to 15 minutes before sunset is associated with a flight possible area of 40 m. A time period from 15 minutes to 10 minutes before sunset is associated with a flight possible area of 30 m. A time period from 10 minutes to 5 minutes before sunset is associated with a flight possible area of 20 m. A time period from 5 minutes before sunset to sunset is associated with a flight possible area of 10 m.

The above flight possible area table 122 is an example, and time periods and flight possible areas are not limited to those described above.

The controller positional information 123 indicates a current position of the controller 20. The second communication unit 105 regularly receives the controller positional information 123 transmitted from the controller 20 and stores the received controller positional information 123 in the storage unit 108.

The sunset information 126 indicates a time of sunset of the day. When the date changes, for example, the second communication unit 105 obtains sunset information indicating a time of sunset of the day from an external server and stores the obtained sunset information in the storage unit 108. Alternatively, the second communication unit 105 may obtain sunset information input by the operator 1 and store the obtained sunset information in the storage unit 108. Alternatively, the storage unit 108 may store, in advance, sunset information in which dates and times of sunset are associated with each other.

As with the sunset information 126, the flight basic program 121, the flight possible area table 122, and the forcible movement program 124 may be obtained from an external server.

The flight possible area changing section 112 determines a flight possible area of the drone 10 in accordance with a difference between an end of a time period for which the flight of the drone 10 is permitted and the present time. In the present embodiment, the end of the time period is the time of sunset at the position of the drone 10. The flight possible area changing section 112 determines the flight possible area of the drone 10 in accordance with a difference between the time of sunset and the present time. The flight possible area changing section 112 reads the sunset information 126 from the storage unit 108, obtains the present time from the time measuring unit 101, and calculates the difference between the time of sunset and the present time. The flight possible area changing section 112 then refers to the flight possible area table 122 and extracts a flight possible area associated with the difference between the time of sunset and the present time.

In addition, the flight possible area changing section 112 sequentially reduces the flight possible area as time elapses. In the present embodiment, the flight possible area changing section 112 reduces the flight possible area by determining the flight possible area as 50 m 30 minutes before sunset and as 40 m 20 minutes before sunset. The flight possible area changing section 112 thus sequentially reduces the flight possible area as sunset approaches.

The flight possible area information 125 indicates the current flight possible area of the drone 10 determined by the flight possible area changing section 112.

The flight control section 111 controls the drone 10 such that the drone 10 flies within the flight possible area. If the flight control section 111 receives an operation command for flying out of the flight possible area, for example, the flight control section 111 rejects the operation command and controls the drone 10 such that the drone 10 stays within the flight possible area. For example, the flight control section 111 calculates a distance between the drone 10 and the controller 20 on the basis of the current positions of the drone 10 and the controller 20. The flight control section 111 then determines whether the calculated distance is equal to or smaller than the flight possible distance in order to determine whether the drone 10 is located within the flight possible area.

The forcible movement program 124 is used to fly the drone 10 forcibly. The forcible movement control section 113 executes the forcible movement program 124 to fly the drone 10 forcibly in a certain direction. If the flight control section 111 determines that the drone 10 is located outside the flight possible area after the flight possible area changing section 112 determines the flight possible area, the forcible movement control section 113 automatically moves the drone 10 toward the controller 20. If the drone 10 is located outside the flight possible area, the forcible movement control section 113 does not accept any operations other than an operation for moving the drone 10 toward the controller 20.

Although the control unit 107 separately includes the flight control section 111 and the forcible movement control section 113 in the present embodiment, the control unit 107 may include only the flight control section 111, and the flight control section 111 may have the function of the forcible movement control section 113.

If the drone 10 is forcibly caused to fly toward the controller 20, the notification section 114 notifies the controller 20 that the drone 10 is to be forcibly caused to fly toward the controller 20.

In addition, the notification section 114 may determine whether the flight possible area is to be changed and, if so, notify the controller 20 that the flight possible area is to be changed. Before the flight possible area changing section 112 determines the flight possible area, the notification section 114 notifies the controller 20 that the flight possible area is to be determined.

It is assumed, for example, that the flight possible area is changed every 10 minutes from 30 minutes before sunset. In this case, the flight possible area is changed 30 minutes, 20 minutes, and 10 minutes before sunset. If the operator 1 understands a new flight possible area in advance, the operator 1 can guide the drone 10 into the new flight possible area before the flight possible area is changed. The drone 10, therefore, determines the flight possible area and notifies the controller 20 of the flight possible area, for example, 5 minutes before the flight possible area is actually changed. In this example, the drone 10 determines the flight possible areas and notifies the controller 20 of the flight possible areas 35 minutes, 25 minutes, and 15 minutes before sunset.

FIG. 5 is a block diagram illustrating the configuration of the controller 20 according to the first embodiment of the present disclosure. The operator 1 holds the controller 20 with both his/her hands. The controller 20 includes a control unit 201, a position measuring unit 202, a battery 203, a display unit 204, an operation command input unit 205, a first wireless communication unit 206, and a second wireless communication unit 207.

The control unit 201 is a CPU, for example, and controls the operation of the controller 20. The position measuring unit 202 is a GPS, for example, and obtains the current position of the controller 20. The current position of the controller 20 is represented by latitude, longitude, and altitude. The battery 203 is a power supply of the controller 20 and supplies power to the components of the controller 20.

The operation command input unit 205 includes a left stick provided on a left-hand side of the operator 1 and a right stick provided on a right-hand side of the operator 1. When the operator 1 moves the left and right sticks, the operation command input unit 205 outputs angular information regarding inclination angles to the first wireless communication unit 206. The movement of the drone 10 is controlled in accordance with the inclination angles. An operation command includes, for example, angular information indicating the inclination angles of the left and right sticks.

The first wireless communication unit 206 transmits an operation command to the drone 10 through, for example, specified low-power radio communication. The second wireless communication unit 207 transmits various pieces of information to the drone 10 and receives various pieces of information from the drone 10 through a communication standard such as LTE. The second wireless communication unit 207 transmits, to the drone 10, the controller positional information 123 indicating the current position of the controller 20 measured by the position measuring unit 202. The second wireless communication unit 207 receives, from the drone 10, information indicating that the flight possible area is to be changed or information indicating that the drone 10 is forcibly caused to fly toward the controller 20.

Although the second wireless communication unit 207 regularly transmits the current position of the controller 20 measured by the position measuring unit 202 to the drone 10 in the present embodiment, the present disclosure is not particularly limited to this. The second wireless communication unit 207 may receive, from the drone 10, a positional information request for requesting the current position of the controller 20 and then transmit the current position of the controller 20 measured by the position measuring unit 202 to the drone 10, instead.

The display unit 204 displays information, which has been received by the second wireless communication unit 207, indicating that the flight possible area is to be changed.

The display unit 204 also displays information, which has been received by the second wireless communication unit 207, indicating that the drone 10 is forcibly caused to fly toward the controller 20.

The controller 20 may be, for example, a smartphone, a tablet computer, or a personal computer. The controller 20 may display an operation screen on a touch panel and receive an operation performed by the operator 1.

Next, a process for controlling the flight of the drone 10 according to the first embodiment will be described.

Figure 6:
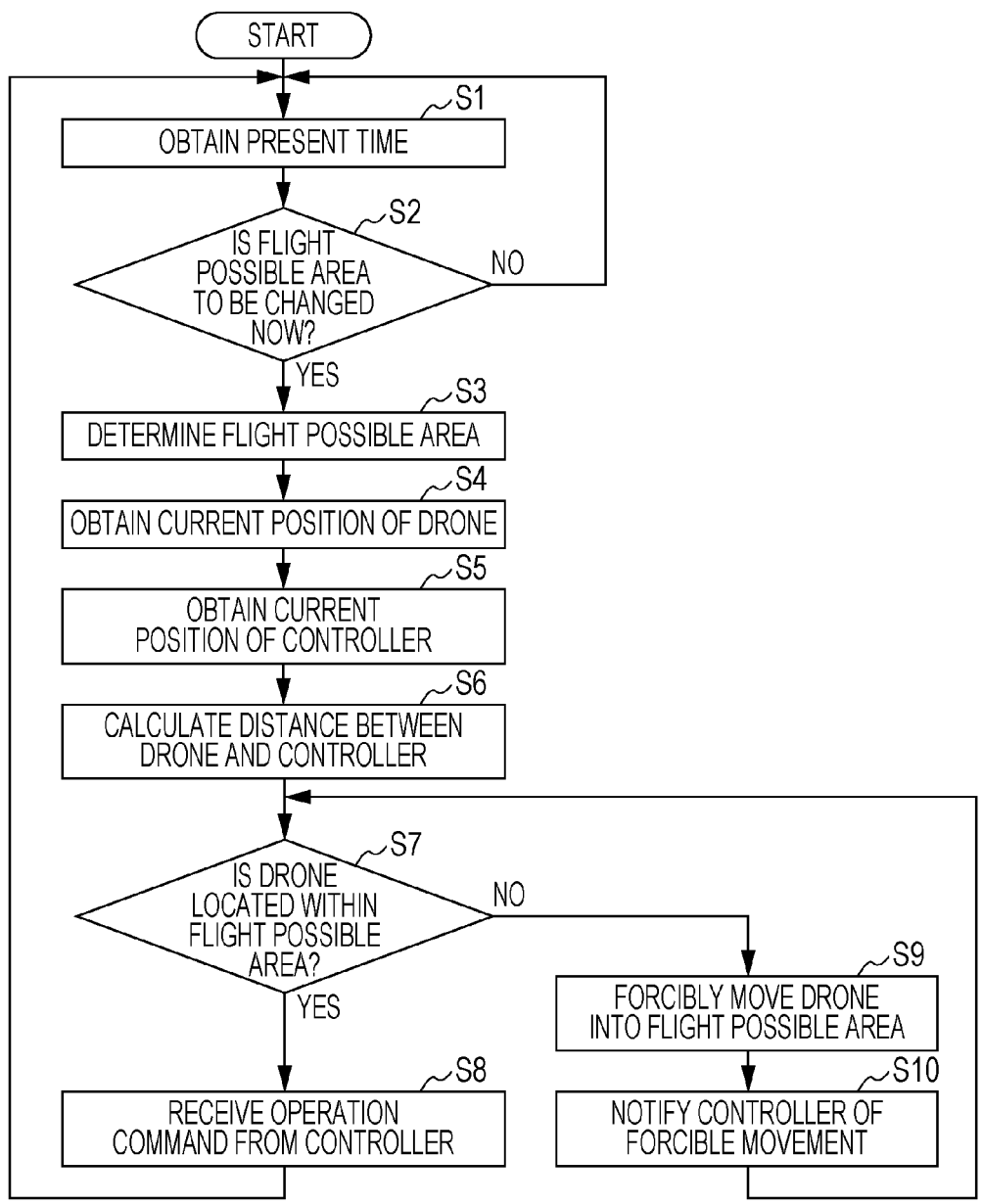
FIG. 6 is a flowchart illustrating a process for controlling the flight of the drone according to the first embodiment of the present disclosure.

FIG. 6 is a flowchart illustrating the process for controlling the flight of the drone 10 according to the first embodiment of the present disclosure.

First, in step S1, the time measuring unit 101 obtains the present time.

Next, in step S2, the flight possible area changing section 112 refers to the flight possible area table 122 and determines whether the flight possible area is to be changed now. The flight possible area is changed certain periods of time before sunset. The flight possible area refers to a distance within which the drone 10 can return to the controller 20 (operator 1) before sunset. If the flight possible area changing section 112 determines that the flight possible area is not to be changed now (NO in step S2), the process returns to step S1.

If the flight possible area changing section 112 determines that the flight possible area is to be changed now (YES in step S2), on the other hand, the flight possible area changing section 112, in step S3, determines the flight possible area of the drone 10 in accordance with the difference between the time of sunset and the present time. If the difference between the time of sunset and the present time is 30 minutes, for example, the flight possible area changing section 112 refers to the flight possible area table 122 and determines a hemisphere whose center is the current position of the controller 20 and whose radius is 50 m as the flight possible area. The flight possible area changing section 112 then stores the determined flight possible area in the storage unit 108 as the flight possible area information 125.

If the current positions of the drone 10 and the controller 20 include latitude information, longitude information, and altitude information, the flight possible area has a hemispherical shape whose center is the current position of the controller 20 and whose radius is the flight possible distance. If the current positions of the drone 10 and the controller 20 include latitude information and longitude information but do not include altitude information, the flight possible area has a circular shape whose center is the current position of the controller 20 and whose radius is the flight possible distance.

Next, in step S4, the position measuring unit 102 obtains the current position of the drone 10.

Next, in step S5, the flight possible area changing section 112 reads the controller positional information 123 from the storage unit 108 to obtain the current position of the controller 20. Although the controller positional information 123 stored in the storage unit 108 does not necessarily indicate the current position of the controller 20, the accuracy of identification of the current position of the controller 20 can be increased by obtaining the controller positional information 123 from the controller 20 more frequently. Alternatively, in step S5, the second communication unit 105 may request the current position from the controller 20 and receive the current position from the controller 20.

Next, in step S6, the flight possible area changing section 112 calculates the distance between the drone 10 and the controller 20 on the basis of the current positions of the drone 10 and the controller 20.

Next, in step S7, the flight possible area changing section 112 determines, on the basis of the distance between the drone 10 and the controller 20 and the flight possible area, whether the drone 10 is located within the flight possible area. That is, the flight possible area changing section 112 compares the distance between the drone 10 and the controller 20 with the flight possible distance and, if the distance between the drone 10 and the controller 20 is equal to or smaller than the flight possible distance, determines that the drone 10 is located within the flight possible area or, if the distance between the drone 10 and the controller 20 is larger than the flight possible distance, determines that the drone 10 is not located within the flight possible area.

If the flight possible area changing section 112 determines that the drone 10 is located within the flight possible area (YES in step S7), the flight control section 111, in step S8, accepts an operation command from the controller 20 and flies the drone 10 in accordance with the operation command. At this time, the flight control section 111 moves the drone 10 in accordance with an operation performed by the operator 1. The flight control section 111 generates driving signals for driving the propellers on the basis of the operation command received by the first communication unit 104 and outputs the generated driving signals to the driving unit 103. The drone 10 can move forward, rearward, leftward, rightward, upward, and downward by controlling rotational speeds of the propellers. The flight control section 111 may detect changes in a flight attitude on the basis of outputs from a three-axis gyro sensor (not illustrated) and a three-axis acceleration sensor (not illustrated) and automatically stabilize the flight attitude of the drone 10.

If the flight possible area changing section 112 determines that the drone 10 is not located within the flight possible area (NO in step S7), on the other hand, the forcible movement control section 113, in step S9, forcibly moves the drone 10 toward the controller 20 so that the drone 10 enters the flight possible area. At this time, the forcible movement control section 113 does not accept an operation command from the controller 20 until the drone 10 enters the flight possible area.

Next, in step S10, the notification section 114 notifies the controller 20 that the drone 10 is forcibly moved toward the controller 20. The process returns to step S7, and the forcible movement control section 113 automatically flies the drone 10 toward the controller 20 until the drone 10 enters the flight possible area.

Figure 7:
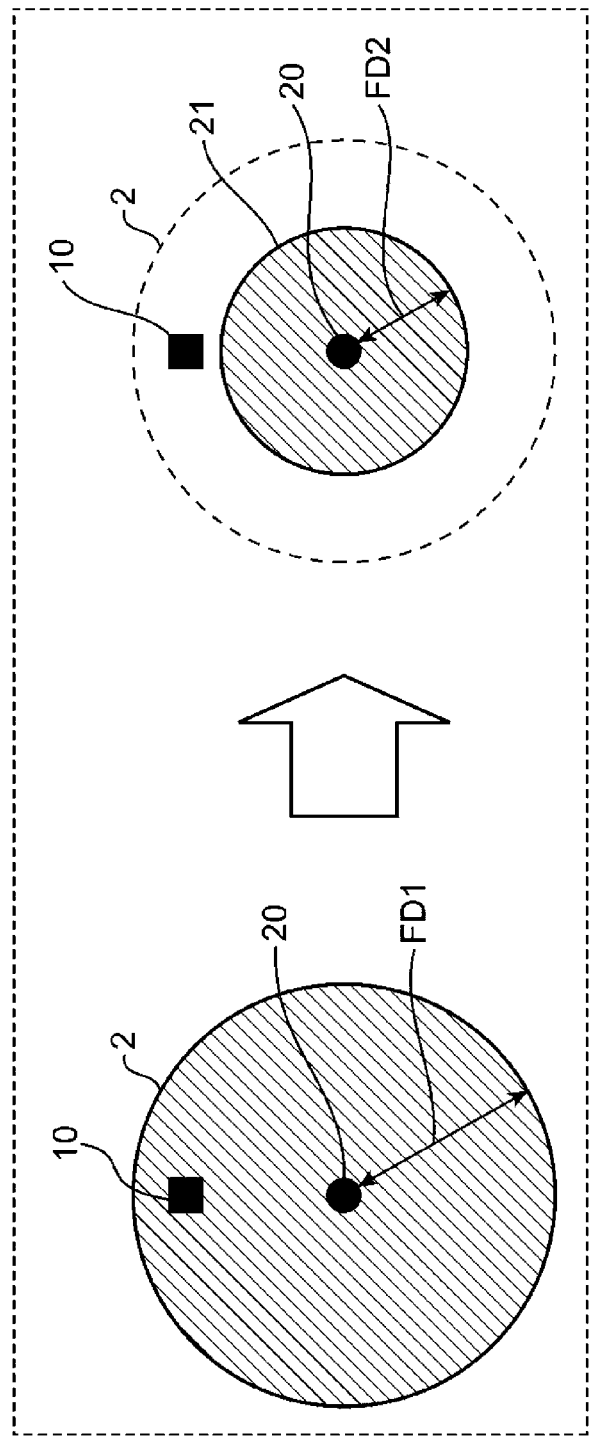
FIG. 7 is a schematic diagram illustrating reduction of a flight possible area according to the first embodiment.

FIG. 7 is a schematic diagram illustrating the reduction of the flight possible area according to the first embodiment. In FIG. 7, the drone 10 and the controller 20 are viewed from above. In FIG. 7, the flight possible area changing section 112 determines, at a first time, which is a certain period of time before sunset, a flight possible area 2 whose center is the controller 20 and whose radius is a flight possible distance FD1. The flight possible area changing section 112 then determines, at a second time, which is closer to the time of sunset than the first time is, a flight possible area 21 whose center is the controller 20 and whose radius is a flight possible distance FD2, which is smaller than the flight possible distance FD1.

The flight possible area changing section 112 thus reduces the flight possible area as sunset approaches. As a result, the drone 10 can return to the controller 20 before sunset, and it becomes possible to prevent the drone 10 from flying after sunset.

Although the drone 10 can move without any limitation until the flight possible area is determined for the first time in step S3 illustrated in FIG. 6 in the first embodiment, an initial flight possible area may be determined in advance before the flight possible area is determined for the first time in step S3 illustrated in FIG. 6. The initial flight possible area is, for example, a visible area predetermined in accordance with regulations, a visible area determined by the operator 1, or an area in which radio communication can be performed.

Although the end of the time period for which the flight of the drone 10 is permitted is the time of sunset in the first embodiment, the present disclosure is not particularly limited to this. For example, a predetermined time, namely 5 p.m. or 6 p.m., for example, may be the end of the time period, instead. Alternatively, the end of the time period may be a time of sunset at the position of the controller 20.

In addition, although the flight possible area has a circular shape, the present disclosure is not particularly limited to this. For example, the flight possible area may have an elliptical shape, instead. That is, the moving speed of the drone 10 might change in accordance with wind direction and wind speed. The flight possible area changing section 112, therefore, may change the shape of the flight possible area in accordance with wind direction and wind speed.

In addition, in the first embodiment, the controller 20 may include the time measuring unit 101, the flight possible area changing section 112, the forcible movement control section 113, the flight possible area table 122, the forcible movement program 124, the flight possible area information 125, and the sunset information 126. In this case, the forcible movement control section 113 has a function of generating and transmitting a command for forcibly moving the drone 10. The forcible movement program 124 is used to generate and transmit a command for forcibly moving the drone 10. The flight possible area table 122, the forcible movement program 124, the flight possible area information 125, and the sunset information 126 are stored in a storage unit of the controller 20. The storage unit also stores positional information regarding the drone 10. As a result, the controller 20 can perform the processes performed by the drone 10 in the above description.

In addition, if the drone 10 is located outside the flight possible area when the flight possible area changing section 112 has determined the flight possible area, the forcible movement control section 113 may transmit, to the drone 10, a control signal for automatically moving the drone 10 toward the controller 20. Furthermore, if the drone 10 is located outside the flight possible area, the forcible movement control section 113 need not transmit a control signal for instructing the drone 10 to perform an operation other than moving toward the controller 20.

In addition, in the first embodiment, the flight control system may include the drone 10, the controller 20, and a server. The server is connected to the controller 20 through a network. The server may include the time measuring unit 101, the flight possible area changing section 112, the forcible movement control section 113, the flight possible area table 122, the forcible movement program 124, the flight possible area information 125, and the sunset information 126. In this case, the forcible movement control section 113 has a function of generating and transmitting a command for forcibly moving the drone 10. The forcible movement program 124 is used to generate and transmit a command for forcibly moving the drone 10. The flight possible area table 122, the forcible movement program 124, the flight possible area information 125, and the sunset information 126 are stored in a storage unit of the server. The storage unit also stores positional information regarding the drone 10. As a result, the server can perform the processes performed by the drone 10 in the above description. Information transmitted from the server may be received by the drone 10 through the controller 20, and information transmitted from the drone 10 may be received by the server through the controller 20. Alternatively, information transmitted from the server may be directly received by the drone 10, and information transmitted from the drone 10 may be directly received by the server.

Second Embodiment

Next, a flight control system according to a second embodiment will be described.

Figure 8:
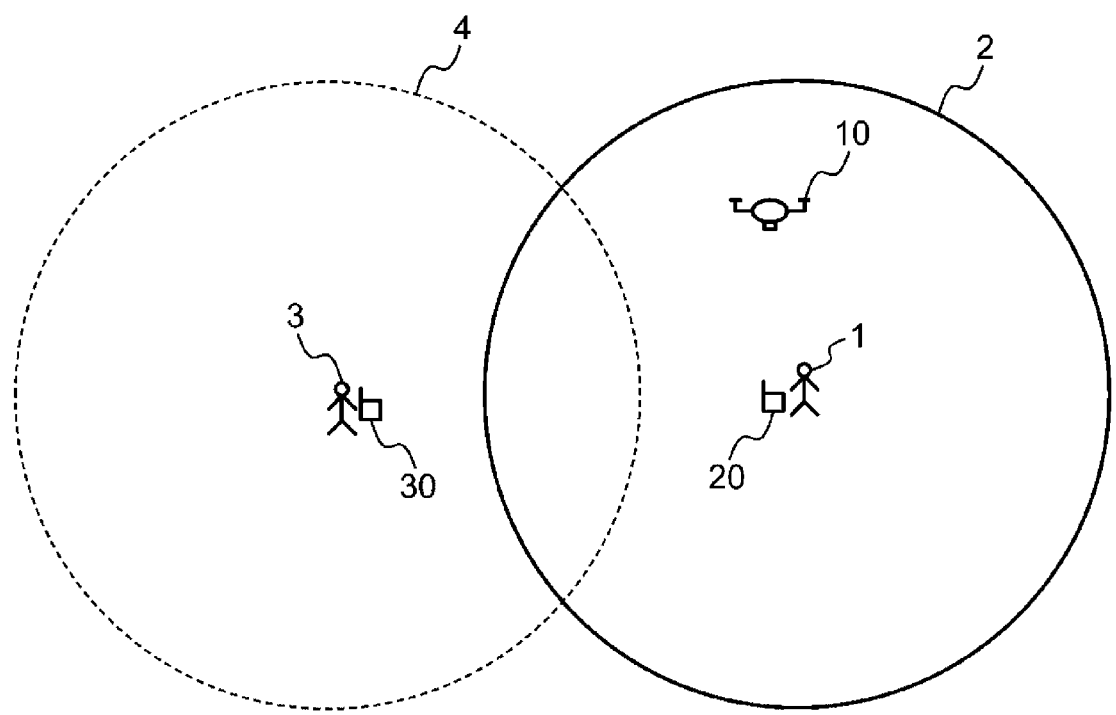
FIG. 8 is a diagram illustrating the configuration of a flight control system according to a second embodiment of the present disclosure.

FIG. 8 is a diagram illustrating the configuration of the flight control system according to the second embodiment of the present disclosure. The flight control system illustrated in FIG. 8 includes a drone 10, the controller 20, and a communication terminal 30.

When the drone 10 flies outside a visible area of the operator 1, a visual observer (VO) 3 monitors the drone 10 on behalf of the operator 1. The VO 3 is located far from the operator 1 and notifies the operator 1 of the position of the drone 10. The VO 3 may call the operator 1 in order to tell the operator 1 the position of the drone 10. The VO 3 carries the communication terminal 30 capable of communicating with the controller 20 and tells the operator 1 the position of the drone 10 through the communication terminal 30 and the controller 20.

If there is a VO 3 as well as the operator 1, a first flight possible area 2 around the operator 1 and a second flight possible area 4 around the VO 3 can be determined. When the first and second flight possible areas 2 and 4 determined by the operator 1 and the VO 3, respectively, have been reduced as sunset approaches, the first and second flight possible areas 2 and 4 might be separated from each other and the drone 10 might not be located within either the first flight possible area 2 or the second flight possible area 4. In the second embodiment, therefore, when the first and second flight possible areas 2 and 4 will be separated from each other, the controller 20 is notified that the first and second flight possible areas 2 and 4 will be separated from each other and the drone 10 needs to be moved into the first flight possible area 2 around the controller 20.

Figure 9:
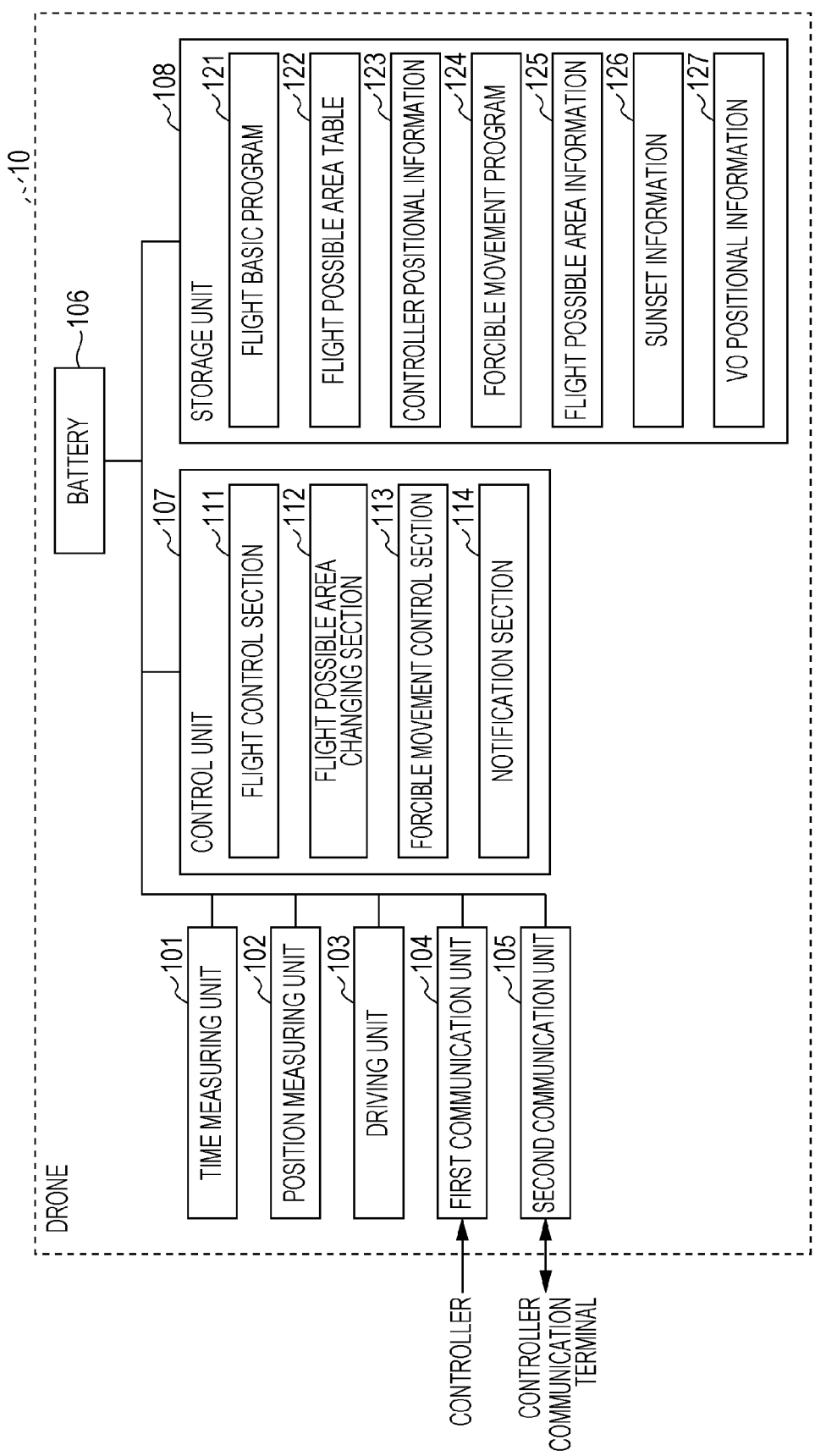
FIG. 9 is a block diagram illustrating the configuration of a drone according to the second embodiment of the present disclosure.

FIG. 9 is a block diagram illustrating the configuration of the drone 10 according to the second embodiment of the present disclosure. The drone 10 illustrated in FIG. 9 includes the time measuring unit 101, the position measuring unit 102, the driving unit 103, the first communication unit 104, the second communication unit 105, the battery 106, the control unit 107, and the storage unit 108. In the second embodiment, description of the same components as in the first embodiment is omitted.

The second communication unit 105 transmits various pieces of information to the controller 20 and receives various pieces of information from the controller 20 through a communication standard such as LTE. The second communication unit 105 also transmits various pieces of information to the communication terminal 30 and receives various pieces of information from the communication terminal 30 through a communication standard such as LTE.

The control unit 107 includes the flight control section 111, the flight possible area changing section 112, the forcible movement control section 113, and the notification section 114.

The storage unit 108 stores the flight basic program 121, the flight possible area table 122, the controller positional information 123, the forcible movement program 124, the flight possible area information 125, the sunset information 126, and a VO positional information 127.

The VO positional information 127 is information indicating a current position of the communication terminal 30. The second communication unit 105 regularly receives the VO positional information 127 transmitted from the communication terminal 30 and stores the received VO positional information 127 in the storage unit 108. Alternatively, the communication terminal 30 may transmit the VO positional information 127 to a server, and the drone 10 may receive the VO positional information 127 through the controller 20.

The flight possible area changing section 112 determines the first flight possible area 2 based on the position of the controller 20 and the second flight possible area 4 based on the position of the communication terminal 30 operated by the VO 3 who monitors the drone 10 in accordance with a difference between the end of the time period for which the flight of drone 10 is permitted and the present time.

The notification section 114 estimates, before the flight possible area changing section 112 determines the first and second flight possible areas 2 and 4, whether the drone 10 is located outside the first and second flight possible areas 2 and 4. If estimating that the drone 10 is located outside the first and second flight possible areas 2 and 4, the notification section 114 transmits, to the controller 20, guidance information for guiding the drone 10 into the first flight possible area 2. Alternatively, if estimating that the drone 10 is located outside the first and second flight possible areas 2 and 4, the notification section 114 may transmit, to the communication terminal 30, guidance information for guiding the drone 10 into the first flight possible area 2. The notification section 114 may change a timing at which the notification section 114 transmits the guidance information in accordance with the distance between the controller 20 and the drone 10.

If the drone 10 is located outside the first and second flight possible areas 2 and 4 when the first and second flight possible areas 2 and 4 are determined, the forcible movement control section 113 automatically moves the drone 10 toward the controller 20. When the drone 10 is forcibly caused to fly toward the controller 20, the notification section 114 notifies the controller 20 that the drone 10 is forcibly caused to fly toward the controller 20. Alternatively, when drone 10 is forcibly caused to fly toward the controller 20, the notification section 114 may notify the communication terminal 30 that the drone 10 is forcibly caused to fly toward the controller 20.

The configuration of the controller 20 according to the second embodiment is the same as that of the controller 20 according to the first embodiment, and description thereof is omitted.

Figure 10:
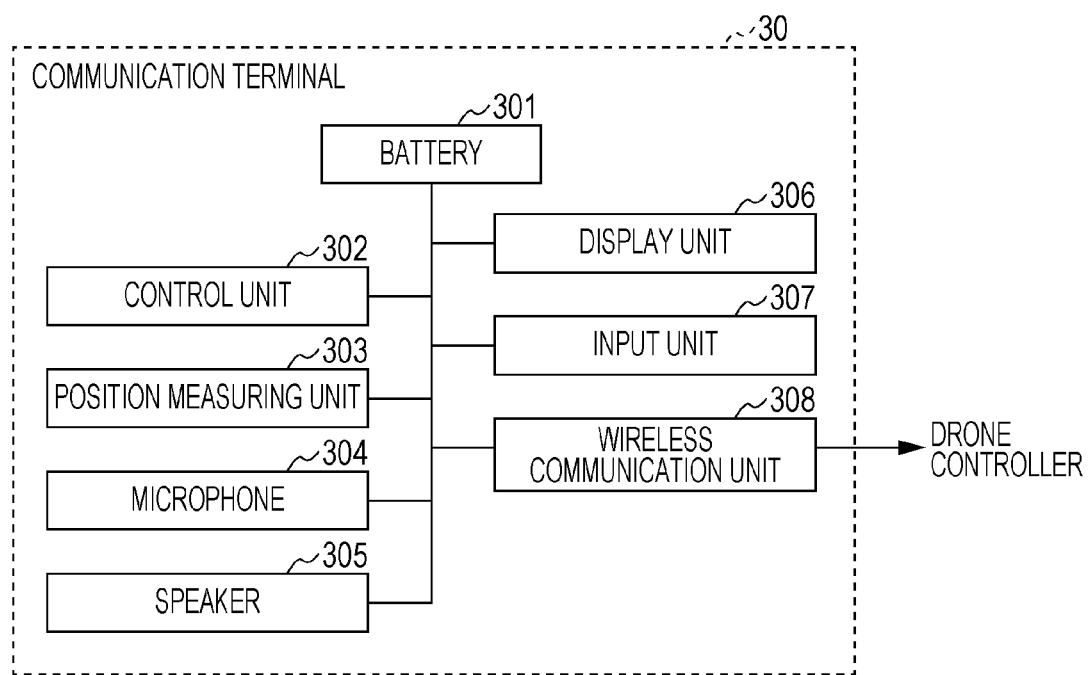
FIG. 10 is a block diagram illustrating the configuration of a communication terminal according to the second embodiment of the present disclosure.

FIG. 10 is a block diagram illustrating the configuration of the communication terminal 30 according to the second embodiment of the present disclosure.

The communication terminal 30 is, for example, a smartphone, a tablet computer, or a personal computer. The communication terminal 30 includes a battery 301, a control unit 302, a position measuring unit 303, a microphone 304, a speaker 305, a display unit 306, an input unit 307, and a wireless communication unit 308.

The battery 301 is a power supply of the communication terminal 30 and supplies power to the components of the communication terminal 30. The control unit 302 is a CPU, for example, and controls the operation of the communication terminal 30.

The position measuring unit 303 is a GPS, for example, and obtains the current position of the communication terminal 30. The current position of the communication terminal 30 is represented by latitude, longitude, and altitude.

The microphone 304 obtains a speech sound uttered by the VO 3 and converts the obtained speech sound into a speech signal. The speaker 305 converts a speech signal transmitted from the controller 20 into a speech sound and outputs the obtained speech sound to the outside.

The display unit 306 displays various pieces of information relating to telephone calls. The input unit 307 receives various pieces of information relating to telephone calls.

The wireless communication unit 308 transmits various pieces of information to the drone 10 and receives various pieces of information from the drone 10 through a communication standard such as LTE. The wireless communication unit 308 transmits various pieces of information to the controller 20 and receives various pieces of information from the controller 20. The wireless communication unit 308 transmits, to the drone 10, the VO positional information 127 indicating the current position of the communication terminal 30 measured by the position measuring unit 303. The wireless communication unit 308 also transmits a speech signal to the controller 20 and receives a speech signal from the controller 20.

It is sufficient that the communication terminal 30 at least includes the position measuring unit 303 and the wireless communication unit 308. The controller 20 preferably includes a microphone and a speaker used to communicate with the communication terminal 30.

Next, a separation notification process performed by the drone 10 according to the second embodiment will be described. The separation notification process is a process for notifying the controller 20 that the first and second flight possible areas 2 and 4 will be separated from each other.

Figure 11:
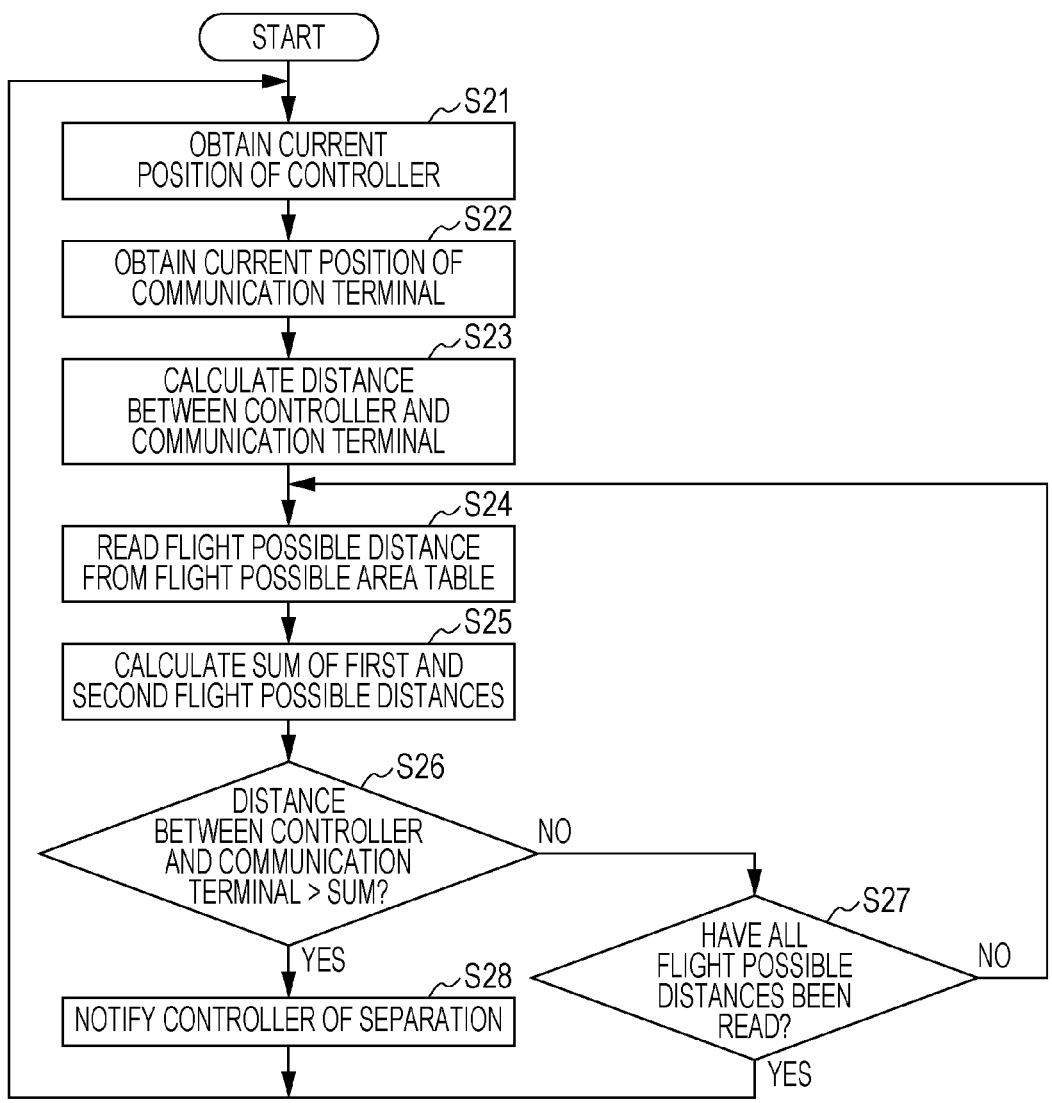
FIG. 11 is a flowchart illustrating a separation notification process performed by the drone according to the second embodiment of the present disclosure.

FIG. 11 is a flowchart illustrating the separation notification process performed by the drone 10 according to the second embodiment of the present disclosure.

First, in step S21, the notification section 114 reads the controller positional information 123 from the storage unit 108 to obtain the current position of the controller 20. Although the controller positional information 123 stored in the storage unit 108 does not necessarily indicate the current position of the controller 20, the accuracy of identification of the current position of the controller 20 can be increased by obtaining the controller positional information 123 from the controller 20 more frequently. In addition, in step S21, the second communication unit 105 may request the current position of the controller 20 from the controller 20 and receive the current position of the controller 20 from the controller 20.

Next, in step S22, the notification section 114 reads the VO positional information 127 from the storage unit 108 to obtain the current position of the communication terminal 30. Although the VO positional information 127 stored in the storage unit 108 does not necessarily indicate the current position of the communication terminal 30, the accuracy of identification of the current position of the communication terminal 30 can be increased by obtaining the VO positional information 127 from the communication terminal 30 more frequently. In addition, in step S22, the second communication unit 105 may request the current position of the communication terminal 30 from the communication terminal 30 and receive the current position of the communication terminal 30 from the communication terminal 30.

Next, in step S23, the notification section 114 calculates a distance between the controller 20 and the communication terminal 30 on the basis of the distance between the controller 20 and the communication terminal 30.

Next, in step S24, the notification section 114 reads the flight possible distance from the flight possible area table 122 stored in the storage unit 108. The notification section 114 reads a flight possible distance in a top row in a first operation, and then sequentially reads flight possible distances in lower rows in second and later operations.

Next, in step S25, the notification section 114 calculates the sum of a first flight possible distance, which is a radius of the first flight possible area 2 around the controller 20, and a second flight possible distance, which is a radius of the second flight possible area 4 around the communication terminal 30. In the second embodiment, the first and second flight possible distances are the same, and the flight possible distance read from the flight possible area table 122 is used as the first and second flight possible distances.

Next, in step S26, the notification section 114 determines whether the distance between the controller 20 and the communication terminal 30 is larger than the sum of the first and second flight possible distances. If determining that the distance between the controller 20 and the communication terminal 30 is equal to or smaller than the sum of the first and second flight possible distances (NO in step S26), the notification section 114, in step S27, determines whether all the flight possible distances in the flight possible area table 122 have been read. If the notification section 114 determines that all the flight possible distances in the flight possible area table 122 have been read (YES in step S27), the process returns to step S21. If the notification section 114 determines that not all the flight possible distances in the flight possible area table 122 have been read (NO in step S27), on the other hand, the process returns to step S24, and the notification section 114 reads a flight possible distance in a next row of the flight possible area table 122 stored in the storage unit 108.

If determining that the distance between the controller 20 and the communication terminal 30 is larger than the sum of the first and second flight possible distances (YES in step S26), on the other hand, the notification section 114, in step S28, notifies the controller 20 that the first and second flight possible areas 2 and 4 will be separated from each other. At this time, the notification section 114 may notify the controller 20 of a time at which the first and second flight possible areas 2 and 4 will be separated from each other, as well as that the first and second flight possible areas 2 and 4 will be separated from each other. The notification section 114 may also notify the controller 20 that the drone 10 will be caused to move into the first flight possible area 2 around the controller 20 after the first and second flight possible areas 2 and 4 are separated from each other.

A timing at which the notification section 114 notifies the controller 20 that the first and second flight possible areas 2 and 4 will be separated from each other may be determined in accordance with the distance between the controller 20 and the drone 10. That is, the drone 10 needs to return to the controller 20 or the communication terminal 30. If the distance between the controller 20 and the drone 10 is large, time taken to return to the controller 20 is long. The notification section 114, therefore, issues a notification earlier as the distance between the controller 20 and the drone 10 becomes larger. For example, the notification section 114 calculates time taken for the drone 10 to return to the controller 20 on the basis of the distance between the controller 20 and the drone 10 and a maximum speed of the drone 10. The notification section 114 may then notify, at a timing obtained by subtracting the return time from the time at which the first and second flight possible areas 2 and 4 will be separated from each other, the controller 20 that the first and second flight possible areas 2 and 4 will be separated from each other.

Alternatively, the notification section 114 may notify the controller 20 that the first and second flight possible areas 2 and 4 are separated from each other when the first and second flight possible areas 2 and 4 are separated from each other.

Next, a process for controlling the flight of the drone 10 according to the second embodiment will be described.

Figure 12:
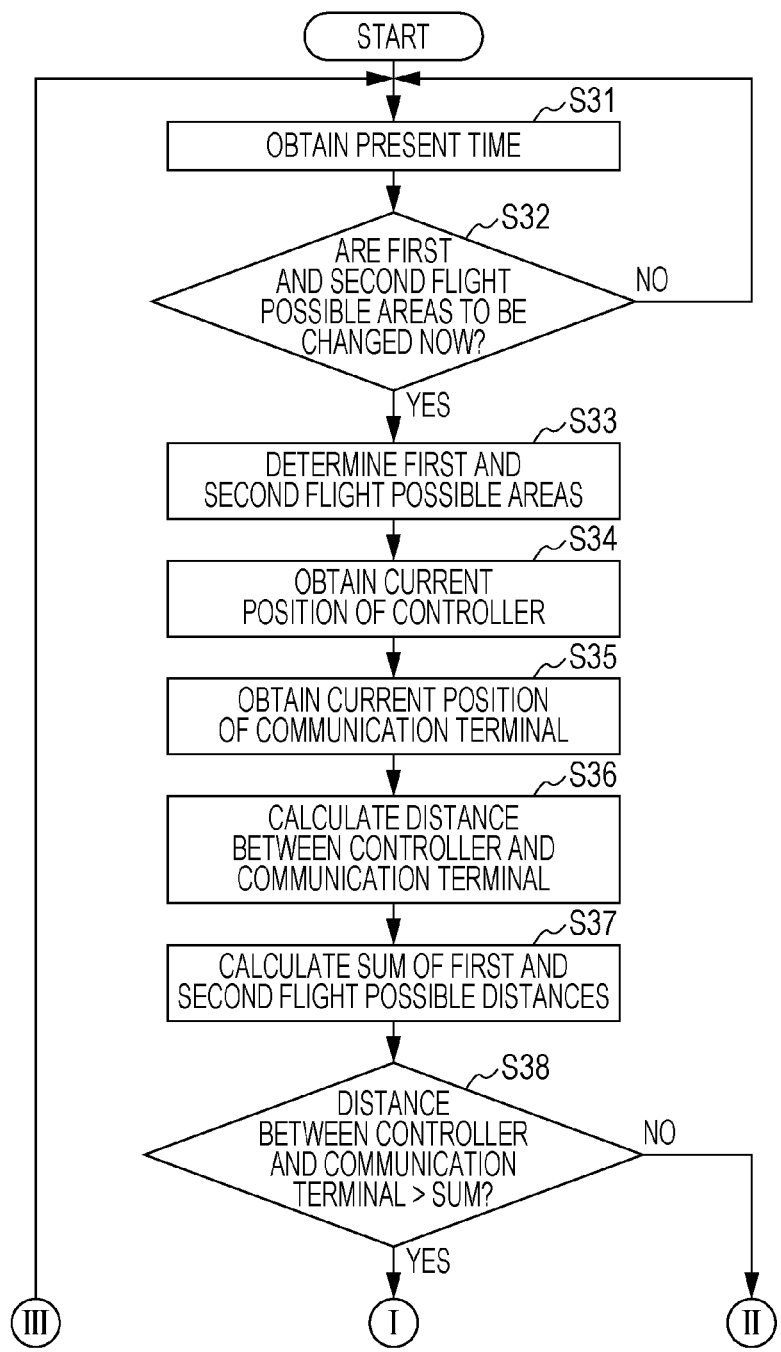
FIG. 12 is a first flowchart illustrating a process for controlling the flight of the drone according to the second embodiment of the present disclosure.
Figure 13:
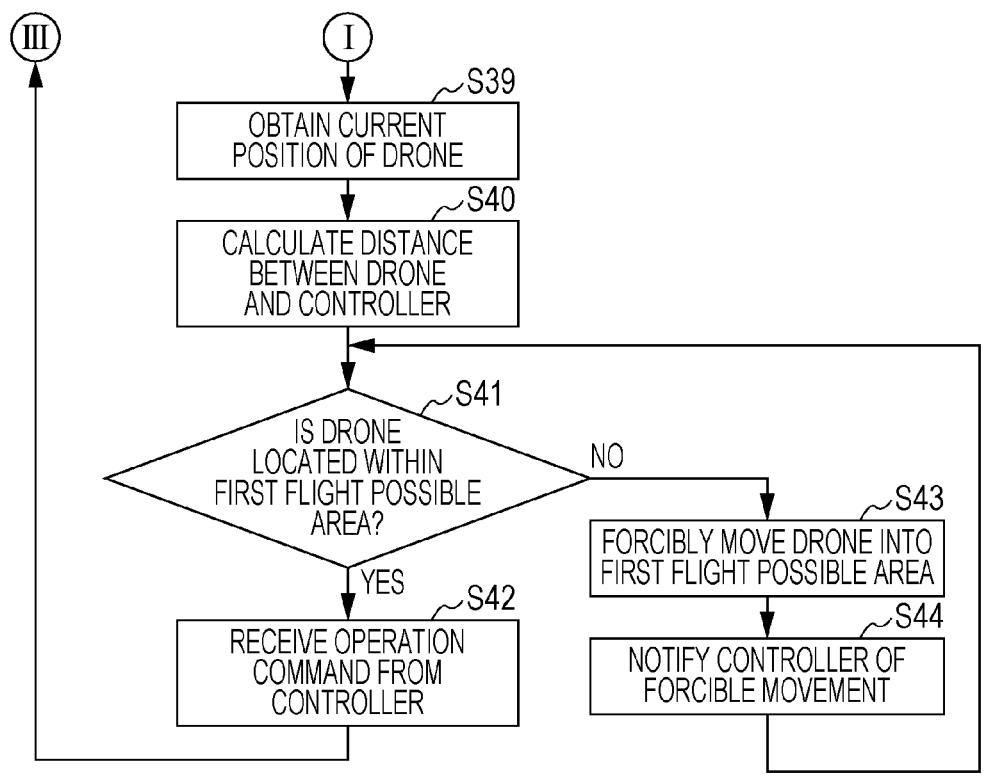
FIG. 13 is a second flowchart illustrating the process for controlling the flight of the drone according to the second embodiment of the present disclosure.
Figure 14:
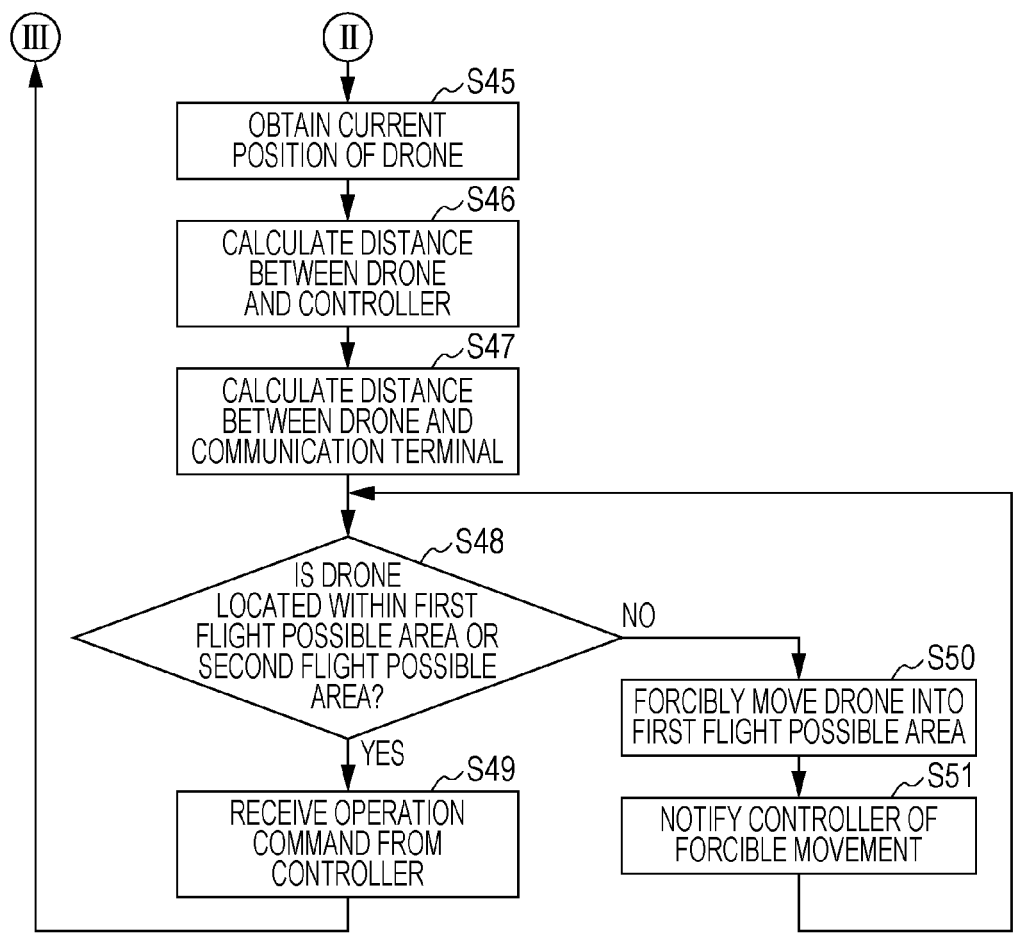
FIG. 14 is a third flowchart illustrating the process for controlling the flight of the drone according to the second embodiment of the present disclosure.

FIG. 12 is a first flowchart illustrating the process for controlling the flight of the drone 10 according to the second embodiment of the present disclosure. FIG. 13 is a second flowchart illustrating the process for controlling the flight of the drone 10 according to the second embodiment of the present disclosure. FIG. 14 is a third flowchart illustrating the process for controlling the flight of the drone 10 according to the second embodiment of the present disclosure.

First, in step S31, the time measuring unit 101 obtains the present time.

Next, in step S32, the flight possible area changing section 112 refers to the flight possible area table 122 and determines whether the first and second flight possible areas 2 and 4 are to be changed now. A time to change the first flight possible area 2 and a time to change the second flight possible area 4 are the same. If the flight possible area changing section 112 determines that the first and second flight possible areas 2 and 4 are not to be changed now (NO in step S32), the process returns to step S31.

If determining that the first and second flight possible areas 2 and 4 are to be changed now (YES in step S32), the flight possible area changing section 112, in step S33, determines the first and second flight possible areas 2 and 4 of the drone 10 in accordance with the difference between the time of sunset and the present time. If the difference between the time of sunset and the present time is 30 minutes, for example, the flight possible area changing section 112 refers to the flight possible area table 122 and determines a hemisphere whose center is the controller 20 and whose radius is 50 m as the first and second flight possible areas 2 and 4. The flight possible area changing section 112 stores the determined first and second flight possible areas 2 and 4 in the storage unit 108 as the flight possible area information 125.

In the second embodiment, the first and second flight possible areas 2 and 4 have the same flight possible distance, and the flight possible area read from the flight possible area table 122 is used as the first and second flight possible areas 2 and 4.

The first flight possible distance of the first flight possible area 2 and the second flight possible distance of the second flight possible area 4 may be different from each other. In this case, the storage unit 108 stores the flight possible area table 122 in which certain time periods before sunset, first flight possible areas 2, and second flight possible areas 4 are associated with one another.

In addition, if the current positions of the drone 10 and the controller 20 include latitude information, longitude information, and altitude information, the first and second flight possible areas 2 and 4 have shapes of hemispheres whose centers are the current position of the controller 20 and whose radii are the first and second flight possible distances, respectively. If the current positions of the drone 10 and the controller 20 include latitude information and longitude information but do not include altitude information, the first and second flight possible areas 2 and 4 have shapes of circles whose centers are the current position of the controller 20 and whose radii are the first and second flight possible distances, respectively.

Next, in step S34, the flight possible area changing section 112 reads the controller positional information 123 from the storage unit 108 to obtain the current position of the controller 20. Although the controller positional information 123 stored in the storage unit 108 does not necessarily indicate the current position of the controller 20, the accuracy of identification of the current position of the controller 20 can be increased by obtaining the controller positional information 123 from the controller 20 more frequently. In addition, in step S34, the second communication unit 105 may request the current position of the controller 20 from the controller 20 and receive the current position of the controller 20 from the controller 20.

Next, in step S35, the flight possible area changing section 112 reads the VO positional information 127 from the storage unit 108 to obtain the current position of the communication terminal 30. Although the VO positional information 127 stored in the storage unit 108 does not necessarily indicate the current position of the communication terminal 30, the accuracy of identification of the current position of the communication terminal 30 can be increased by obtaining the VO positional information 127 from the communication terminal 30 more frequently. In addition, in step S35, the second communication unit 105 may request the current position of the communication terminal 30 from the communication terminal 30 and receive the current position of the communication terminal 30 from the communication terminal 30.

Next, in step S36, the flight possible area changing section 112 calculates the distance between the controller 20 and the communication terminal 30 on the basis of the current positions of the controller 20 and the communication terminal 30.

Next, in step S37, the flight possible area changing section 112 calculates the sum of the first flight possible distance, which is the radius of the first flight possible area 2 around the controller 20, and the second flight possible distance, which is the radius of the second flight possible area 4 around the communication terminal 30.

Next, in step S38, the flight possible area changing section 112 determines whether the distance between the controller 20 and the communication terminal 30 is larger than the sum of the first and flight possible distances. That is, if the distance between the controller 20 and the communication terminal 30 is larger than the sum of the first and flight possible distances, the first and second flight possible areas 2 and 4 do not overlap, that is, are separated from each other.

If the flight possible area changing section 112 determines that the distance between the controller 20 and the communication terminal 30 is larger than the sum of the first and second flight possible distances (YES in step S38), the position measuring unit 102, in step S39, obtains the current position of the drone 10.

Next, in step S40, the flight possible area changing section 112 calculates the distance between the drone 10 and the controller 20 on the basis of the current positions of the drone 10 and the controller 20.

Next, in step S41, the flight possible area changing section 112 determines whether the drone 10 is located within the first flight possible area 2 on the basis of the distance between the drone 10 and the controller 20 and the first flight possible area 2. That is, the flight possible area changing section 112 compares the distance between the drone 10 and the controller 20 with the first flight possible distance and, if the distance between the drone 10 and the controller 20 is equal to or smaller than the first flight possible distance, determines that the drone 10 is located within the first flight possible area 2 or, if the distance between the drone 10 and the controller 20 is larger than the first flight possible distance, determines that the drone 10 is not located within the first flight possible area 2.

If the flight possible area changing section 112 determines that the drone 10 is located within the first flight possible area 2 (YES in step S41), the flight control section 111, in step S42, accepts an operation command from the controller 20 and flies the drone 10 in accordance with the operation command. Step S42 is the same as step S8 illustrated in FIG. 6.

If the flight possible area changing section 112 determines that the drone 10 is not located within the first flight possible area 2 (NO in step S41), on the other hand, the forcible movement control section 113, in step S43, forcibly moves the drone 10 toward the controller 20 so that the drone 10 enters the first flight possible area 2. At this time, the forcible movement control section 113 does not accept an operation command from the controller 20 until the drone 10 enters the first flight possible area 2.

Next, in step S44, the notification section 114 notifies the controller 20 that the drone 10 is to be forcibly moved toward the controller 20. The process returns to step S41, and the forcible movement control section 113 automatically flies the drone 10 toward the controller 20 until the drone 10 enters the first flight possible area 2.

If the flight possible area changing section 112 determines in step S38 that the distance between the controller 20 and the communication terminal 30 is equal to or smaller than the sum of the first and second flight possible distances (NO in step S38), on the other hand, the position measuring unit 102, in step S45, obtains the current position of the drone 10.

Next, in step S46, the flight possible area changing section 112 calculates the distance between the drone 10 and the controller 20 on the basis of the current positions of the drone 10 and the controller 20.

Next, in step S47, the flight possible area changing section 112 calculates the distance between the drone 10 and the communication terminal 30 on the basis of the current positions of the drone 10 and the communication terminal 30.

Next, in step S48, the flight possible area changing section 112 determines whether or not the drone 10 is located within the first flight possible area 2 or the second flight possible area 4 on the basis of the distance between the drone 10 and the controller 20, the distance between the drone 10 and the communication terminal 30, the first flight possible area 2, and the second flight possible area 4. That is, the flight possible area changing section 112 compares the distance between the drone 10 and the controller 20 with the first flight possible distance and, if the distance between the drone 10 and the controller 20 is equal to or smaller than the first flight possible distance, determines that the drone 10 is located within the first flight possible area 2. The flight possible area changing section 112 compares the distance between the drone 10 and the communication terminal 30 with the second flight possible distance and, if the distance between the drone 10 and the communication terminal 30 is equal to or smaller than the second flight possible distance, determines that the drone 10 is located within the second flight possible area 4. If the distance between the drone 10 and the controller 20 is larger than the first flight possible distance and if the distance between the drone 10 and the communication terminal 30 is larger than the second flight possible distance, the flight possible area changing section 112 determines that the drone 10 is not located within the first flight possible area 2 or the second flight possible area 4.

If the flight possible area changing section 112 determines that the drone 10 is located within the first flight possible area 2 or the second flight possible area 4 (YES in step S48), the flight control section 111, in step S49, accepts an operation command from the controller 20 and flies the drone 10 in accordance with the operation command. Step S49 is the same as step S8 illustrated in FIG. 6.

If the flight possible area changing section 112 determines that the drone 10 is not located within the first flight possible area 2 or the second flight possible area 4 (NO in step S48), on the other hand, the forcible movement control section 113, in step S50, forcibly moves the drone 10 toward the controller 20 so that the drone 10 enters the first flight possible area 2. At this time, the forcible movement control section 113 does not accept an operation command from the controller 20 until the drone 10 enters the first flight possible area 2.

Next, in step S51, the notification section 114 notifies the controller 20 that the drone 10 is to be forcibly moved toward the controller 20. The process returns to step S48, and the forcible movement control section 113 automatically flies the drone 10 toward the controller 20 until the drone 10 enters the first flight possible area 2.

Figure 15:
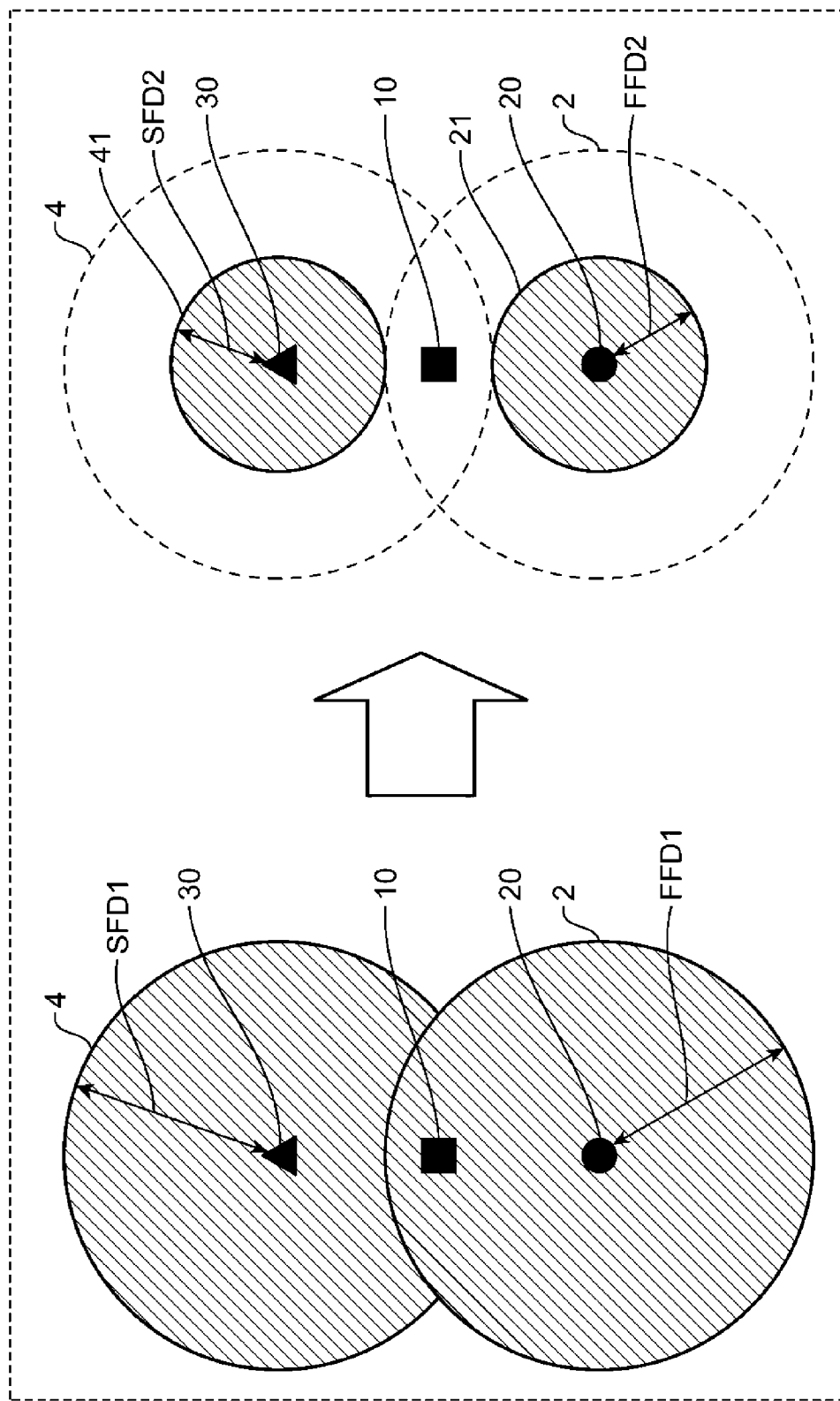
FIG. 15 is a schematic diagram illustrating separation between first and second flight possible areas according to the second embodiment.

FIG. 15 is a schematic diagram illustrating separation between the first and second flight possible areas 2 and 4 according to the second embodiment. In FIG. 15, the drone 10, the controller 20, and the communication terminal 30 are viewed from above. In FIG. 15, the flight possible area changing section 112 determines, at the first time, which is the certain period of time before sunset, the first flight possible area 2 whose center is the controller 20 and whose radius is a first flight possible distance FFD1 and the second flight possible area 4 whose center is the communication terminal 30 and whose radius is a second flight possible distance SFD1. The flight possible area changing section 112 then determines, at the second time, which is closer to the time of sunset than the first time is, a first flight possible area 21 whose center is the controller 20 and whose radius is a first flight possible distance FFD2, which is smaller than the first flight possible distance FFD1, and a second flight possible area 41 whose center is the communication terminal 30 and whose radius is a second flight possible distance SFD2, which is smaller than the second flight possible distance SFD1.

As described above, when the first and second flight possible areas 2 and 4 are reduced, the first and second flight possible areas 21 and 41 might be separated from each other. If the drone 10 is located halfway between the controller 20 and the communication terminal 30 at this time, the drone 10 might not be located within the first flight possible area 21 or the second flight possible area 41. If the first and second flight possible areas 2 and 4 will be reduced and the first and second flight possible areas 21 and 41 will be separated from each other, therefore, the controller 20 is notified that the first and second flight possible areas 21 and 41 will be separated from each other, in order to avoid a situation in which the drone 10 is not located within the first flight possible area 21 or the second flight possible area 41.

In addition, in the second embodiment, if the first and second flight possible areas 2 and 4 are separated from each other, the drone 10 needs to move into the first flight possible area 2 around the controller 20. If the first and second flight possible areas 2 and 4 will be separated from each other, therefore, the controller 20 is notified that the drone 10 needs to move into the first flight possible area 2, but the present disclosure is not particularly limited to this. If the first and second flight possible areas 2 and 4 are separated from each other, the drone 10 may enter either the first flight possible area 2 around the controller 20 or the second flight possible area 4 around the communication terminal 30. In this case, when the first and second flight possible areas 2 and 4 are separated from each other, the controller 20 may be notified that the drone 10 needs to move into the first flight possible area 2 around the controller 20 or the second flight possible area 4 around the communication terminal 30.

At this time, the notification section 114 may estimate, before the flight possible area changing section 112 determines the first and second flight possible areas 2 and 4, whether the drone 10 will be located outside the first and second flight possible areas 2 and 4 when the first and second flight possible areas 2 and 4 are determined. If estimating that the drone 10 will be located outside the first and second flight possible areas 2 and 4, the notification section 114 may transmit, to the controller 20, guidance information for guiding the drone 10 into the first flight possible area 2 or the second flight possible area 4.

If the first and second flight possible areas 2 and 4 will be separated from each other at 5 p.m., for example, the drone 10 may transmit guidance information to the controller 20 at 4 p.m., which says "Flight possible areas will be separated from each other. Move drone into flight possible area around operator or VO".

In addition, although the controller 20 is notified that the first and second flight possible areas 2 and 4 will be separated from each other in the second embodiment, the present disclosure is not particularly limited to this. A terminal (e.g., a smartphone, etc.) carried by the operator 1 may be notified instead of the controller 20.

In addition, if the drone 10 will be located outside the first and second flight possible areas 2 and 4 when the first and second flight possible areas 2 and 4 are determined, the forcible movement control section 113 may automatically move the drone 10 toward the controller 20 or the communication terminal 30, whichever is closer to the drone 10.

In addition, the operator 1 or the VO 3 might move in the second embodiment. The separation notification process illustrated in FIG. 11 may be regularly performed, and the controller 20 may be notified of separation between the first and second flight possible areas 2 and 4 in real-time.

In addition, in the second embodiment, the controller 20 may include the time measuring unit 101, the flight possible area changing section 112, the forcible movement control section 113, the flight possible area table 122, the forcible movement program 124, the flight possible area information 125, the sunset information 126, and the VO positional information 127. In this case, the forcible movement control section 113 has a function of generating and transmitting a command for forcibly moving the drone 10. The forcible movement program 124 is used to generate and transmit a command for forcibly moving the drone 10. The flight possible area table 122, the forcible movement program 124, the flight possible area information 125, the sunset information 126, and the VO positional information 127 are stored in the storage unit of the controller 20. The storage unit also stores positional information regarding the drone 10. As a result, the controller 20 can perform the processes performed by the drone 10 in the above description. In addition, the VO positional information 127 transmitted from the communication terminal 30 may be received by the controller 20 through a server.

In addition, in the second embodiment, the flight control system may include the drone 10, the controller 20 and a server. The server is connected to the controller 20 through a network. The server may include the time measuring unit 101, the flight possible area changing section 112, the forcible movement control section 113, the flight possible area table 122, the forcible movement program 124, the flight possible area information 125, the sunset information 126, and the VO positional information 127. In this case, the forcible movement control section 113 has a function of generating and transmitting a command for forcibly moving the drone 10. The forcible movement program 124 is used to generate and transmit a command for forcibly moving the drone 10. The flight possible area table 122, the forcible movement program 124, the flight possible area information 125, the sunset information 126, and the VO positional information 127 are stored in a storage unit of the server. The storage unit also stores positional information regarding the drone 10. As a result, the server can perform the processes performed by the drone 10 in the above description. Information transmitted from the server may be received by the drone 10 through the controller 20, and information transmitted from the drone 10 may be received by the server through the controller 20. Alternatively, information transmitted from the server may be directly received by the drone 10, and information transmitted from the drone 10 may be directly received by the server. Information transmitted from the communication terminal 30 may be received by the server through the controller 20 or directly received by the server.

Now, a case in which there are a plurality of VOs in the second embodiment will be described.

Figure 16:
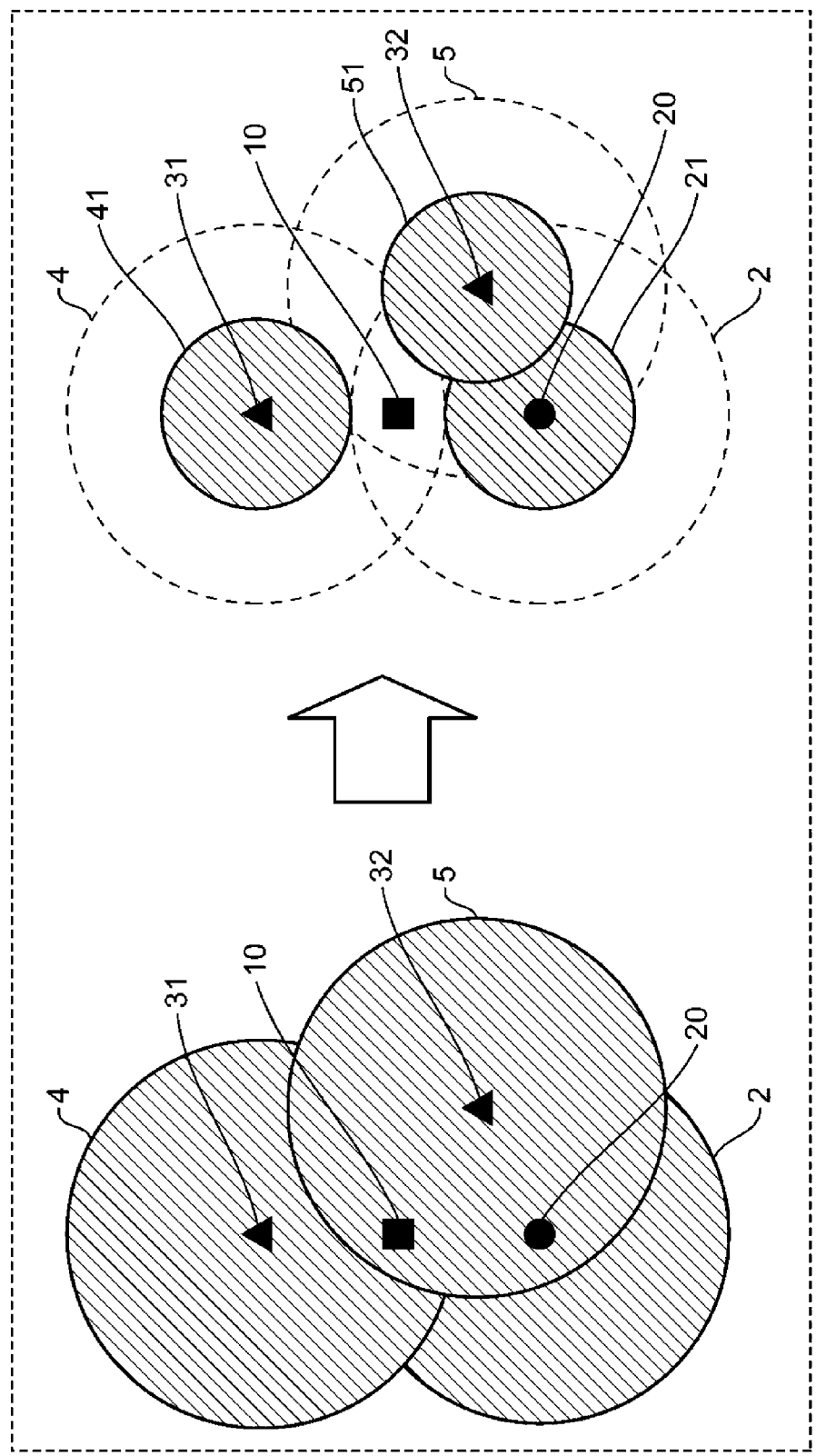
FIG. 16 is a schematic diagram illustrating separation between first to third flight possible areas according to the second embodiment.

FIG. 16 is a schematic diagram illustrating separation between the first flight possible area 2, the second flight possible area 4, and a third flight possible area 5. In the example illustrated in FIG. 16, the flight control system includes the drone 10, the controller 20, a first communication terminal 31, and a second communication terminal 32. The first communication terminal 31 is operated by a first VO who monitors the drone 10. The second communication terminal 32 is operated by a second VO who monitors the drone 10 at a position different from a position of the first VO. The configuration of the first communication terminal 31 and the second communication terminal 32 is the same as that of the communication terminal 30.

In FIG. 16, the drone 10, the controller 20, the first communication terminal 31, and the second communication terminal 32 are viewed from above. In FIG. 16, the flight possible area changing section 112 determines, at the first time, which is the certain period of time before sunset, the first flight possible area 2 whose center is the controller 20 and whose radius is the first flight possible distance, the second flight possible area 4 whose center is the first communication terminal 31 and whose radius is the second flight possible distance, and the third flight possible area 5 whose center is the second communication terminal 32 and whose radius is a third flight possible distance. The flight possible area changing section 112 then determines, at the second time, which is closer to the time of sunset than the first time is, the first flight possible area 21 whose center is the controller 20 and whose radius is the reduced first flight possible distance, the second flight possible area 41 whose center is the first communication terminal 31 and whose radius is the reduced second flight possible distance, and a third flight possible area 51 whose center is the second communication terminal 32 and whose radius is the reduced third flight possible distance.

In FIG. 16, as a result of the reduction of the first to third flight possible areas 2, 4, and 5, the first and third flight possible areas 21 and 51 are separated from the second flight possible area 41. The first flight possible area 21 overlaps the third flight possible area 51.

When the first and third flight possible areas 21 and 51 are separated from the second flight possible area 41, the drone 10 might need to be located within the first flight possible area 21 around the controller 20. At this time, the third flight possible area 51, which is not separated from the first flight possible area 21, may be regarded as a part of the first flight possible area 21.

If the first flight possible area 21 based on the position of the controller 20 and the third flight possible area 51 based on a position of the second communication terminal 32 operated by the second VO who monitors the drone 10 are separated from the second flight possible area 41 based on a position of the first communication terminal 31 operated by the first VO who monitors the drone 10 and the first flight possible area 21 overlaps the third flight possible area 5 after the flight possible area changing section 112 determines the first to third flight possible areas 21, 41, and 51, the notification section 114 may transmit information regarding the third flight possible area 51, which is not separated from the first flight possible area 21, to the controller 20. At this time, the flight control section 111 may control the drone 10 such that the drone 10 flies within the first flight possible area 21 or the third flight possible area 51.

Alternatively, if the first and third flight possible areas 21 and 51 are separated from the second flight possible area 41 and the first flight possible area 2 overlaps the third flight possible area 51 after the flight possible area changing section 112 determines the first to third flight possible areas 21, 41, and 51, the forcible movement control section 113 may automatically move the drone 10 toward the controller 20 or the second communication terminal 32, whichever is closer to the drone 10.

When the first to third flight possible areas 2, 4, and 5 are reduced, the first to third flight possible areas 21, 41, and 51 might not be separated from one another.

Figure 17:
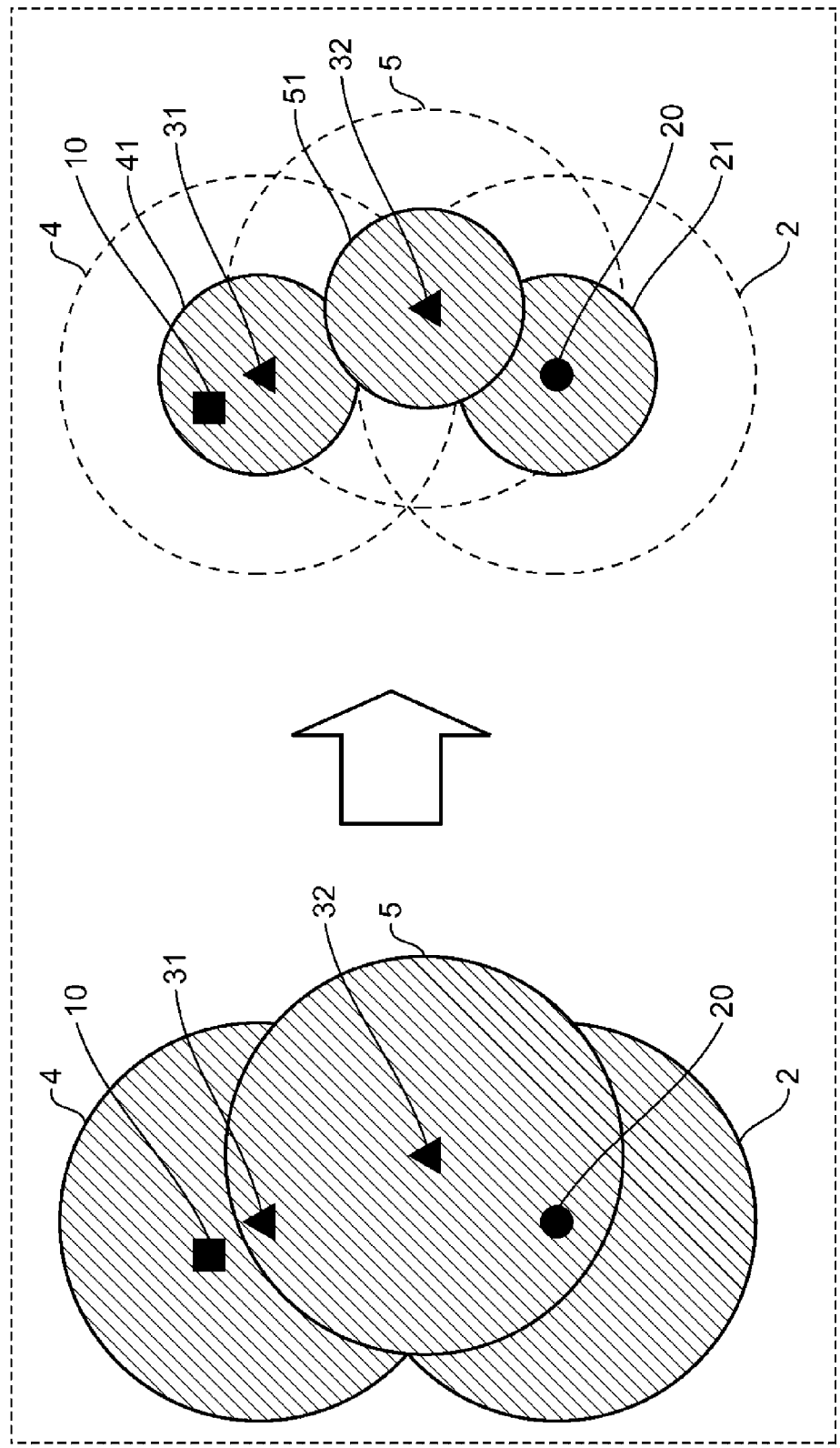
FIG. 17 is a schematic diagram illustrating overlap between the first to third flight possible areas according to the second embodiment.

FIG. 17 is a schematic diagram illustrating overlap between the first to third flight possible areas 2, 4, and 5 according to the second embodiment. In the example illustrated in FIG. 17, the flight control system includes the drone 10, the controller 20, the first communication terminal 31, and the second communication terminal 32. The first communication terminal 31 is operated by the first VO who monitors the drone 10 and the second communication terminal 32 is operated by the second VO who monitors the drone 10 at the position different from that of the first VO.

In FIG. 17, the drone 10, the controller 20, the first communication terminal 31, and the second communication terminal 32 are viewed from above. In FIG. 17, the flight possible area changing section 112 determines, at the first time, which is the certain period of time before sunset, the first flight possible area 2 whose center is the controller 20 and whose radius is the first flight possible distance, the second flight possible area 4 whose center is the first communication terminal 31 whose radius is the second flight possible distance, and the third flight possible area 5 whose center is the second communication terminal 32 and whose radius is the third flight possible distance. The flight possible area changing section 112 then determines, at the second time, which is closer to the time of sunset than the first time is, the first flight possible area 21 whose center is the controller 20 and whose radius is the reduced first flight possible distance, the second flight possible area 41 whose center is the first communication terminal 31 and whose radius is the reduced second flight possible distance, and the third flight possible area 51 whose center is the second communication terminal 32 and whose radius is the reduced third flight possible distance.

In FIG. 17, as a result of the reduction of the first to third flight possible areas 2, 4, and 5, the first flight possible area 21 overlaps the third flight possible area 51, and the second flight possible area 41 overlaps the third flight possible area 51. Although the first flight possible area 21 is separated from the second flight possible area 41 but connected to the second flight possible area 41 through the third flight possible area 51. When the first to third flight possible areas 21, 41, and 51 are connected to one another, the drone 10 may fly within the first flight possible area 21, the second flight possible area 41, or the third flight possible area 51.

If the first to third flight possible areas 21, 41, and 51 are further reduced as time elapses, the first flight possible area 21 might be separated from the second flight possible area 41, or the second flight possible area 41 might be separated from the third flight possible area 51. In this case, it is difficult for the drone 10 located within the second flight possible area 41 or the third flight possible area 51 to return to the first flight possible area 21.

If the first flight possible area 21 based on the position of the controller 20 is separated from the second flight possible area 41 based on the position of the first communication terminal 31 operated by the first VO who monitors the drone 10 and the third flight possible area 51 based on the position of the second communication terminal 32 operated by the second VO who monitors the drone 10 overlap the first and second flight possible areas 21 and 41 after the flight possible area changing section 112 determines the first to third flight possible areas 21, 41, and 51, the notification section 114 may transmit, to the controller 20, guidance information for guiding the drone 10 into the first flight possible area 21 or the third flight possible area 51 adjacent to the first flight possible area 21.

In addition, if the first flight possible area 21 is separated from the second flight possible area 41, the third flight possible area 51 overlaps the first and second flight possible areas 21 and 41, and the drone 10 is located outside the first flight possible area 21 and the third flight possible area 51 after the flight possible area changing section 112 determines the first to third flight possible areas 21, 41, and 51, the forcible movement control section 113 may forcibly move the drone 10 toward the controller 20 or the second communication terminal 32 so that the drone 10 enters the first flight possible area 21 or the third flight possible area 51.

If the first flight possible area 21 is separated from the second flight possible area 41, the third flight possible area 51 overlaps the first and second flight possible areas 21 and 41, and the drone 10 is located outside the first to third flight possible areas 21, 41, and 51 after the flight possible area changing section 112 determines the first to third flight possible areas 21, 41, and 51, the forcible movement control section 113 may forcibly move toward the controller 20 in the first flight possible area 21 or the second communication terminal 32 in the third flight possible area 51, whichever is closer to the drone 10.

If the first to third flight possible areas 21, 41, and 51 are further reduced and the first to third flight possible areas 21, 41, and 51 are separated from one another, the drone 10 may be moved into a largest flight possible area.

Figure 18:
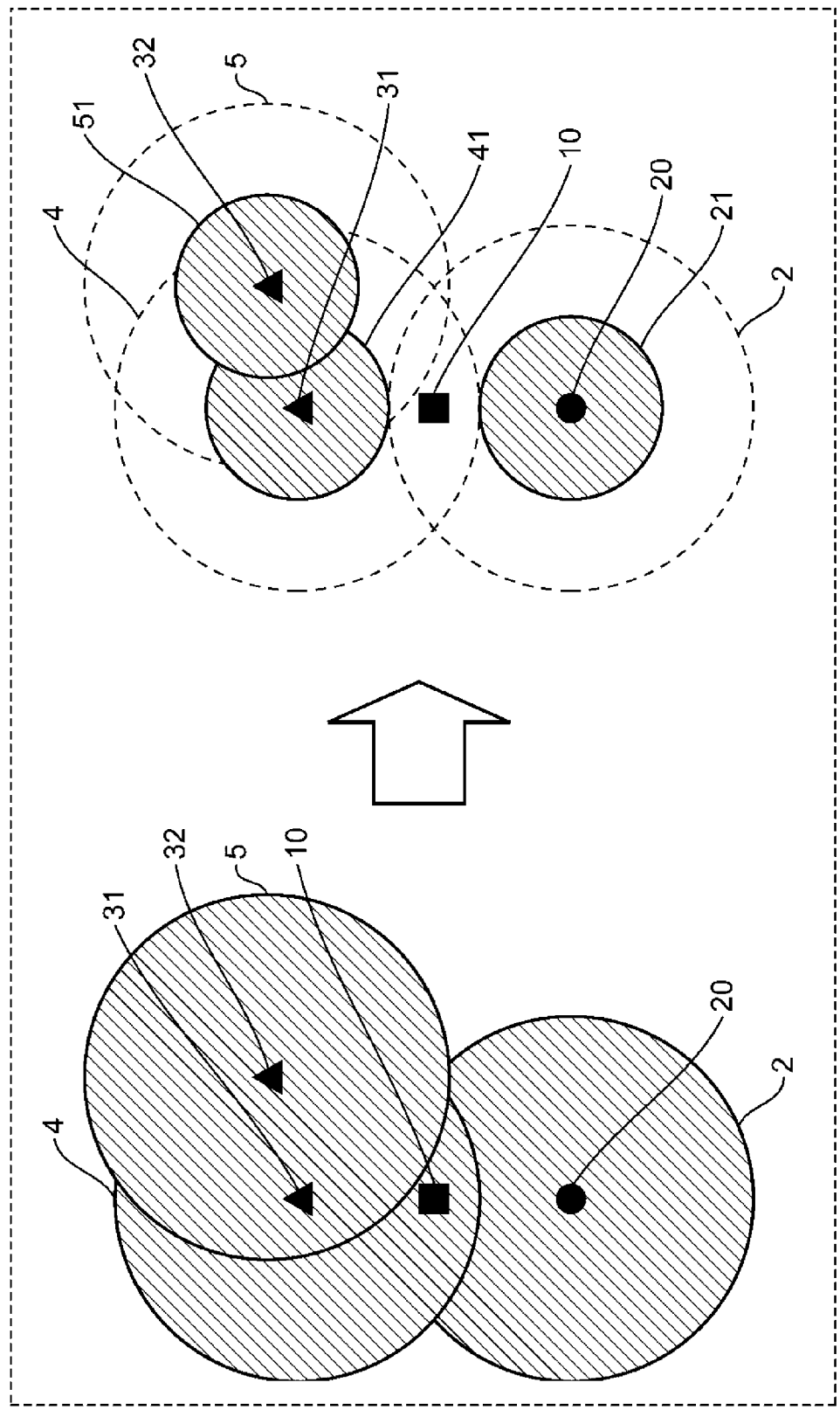
FIG. 18 is a schematic diagram illustrating a process for moving the drone into a largest one of the plurality of flight possible areas separated from one another.

FIG. 18 is a schematic diagram illustrating a process for moving the drone 10 into a largest one of the plurality of flight possible areas 21, 41, and 51 separated from one another. In the example illustrated in FIG. 18, the flight control system includes the drone 10, the controller 20, the first communication terminal 31, and the second communication terminal 32. The first communication terminal 31 is operated by the first VO who monitors the drone 10, and the second communication terminal 32 is operated by the second VO who monitors the drone 10 at the position different from that of the first VO.

In FIG. 18, the drone 10, the controller 20, the first communication terminal 31, and the second communication terminal 32 are viewed from above. In FIG. 18, the flight possible area changing section 112 determines, at the first time, which is the certain period of time before sunset, the first flight possible area 2 whose center is the controller 20 and whose radius is the first flight possible distance, the second flight possible area 4 whose center is the first communication terminal 31 and whose radius is the second flight possible distance, and the third flight possible area 5 whose center is the second communication terminal 32 and whose radius is the third flight possible distance. The flight possible area changing section 112 then determines, at the second time, which is closer to the time of sunset than the first time is, the first flight possible area 21 whose center is the controller 20 and whose radius is the reduced first flight possible distance, the second flight possible area 41 whose center is the first communication terminal 31 and whose radius is the reduced second flight possible distance, and the third flight possible area 51 whose center is the second communication terminal 32 and whose radius is the reduced third flight possible distance.

In FIG. 18, as a result of the reduction of the first to third flight possible areas 2, 4, and 5, the first flight possible area 21 is separated from the second and third flight possible areas 41 and 51, and the second flight possible area 41 overlaps the third flight possible area 51.

Here, the forcible movement control section 113 calculates the area of the plurality of flight possible areas 21, 41, and 51 and identifies a largest one of the plurality of flight possible areas 21, 41, and 51. If a plurality of flight possible areas overlap at this time, the forcible movement control section 113 counts the plurality of overlapping flight possible areas as one flight possible area and calculates the area of the plurality of overlapping flight possible areas. In the example illustrated in FIG. 18, the second and third flight possible areas 41 and 51 overlap, and the forcible movement control section 113 counts the second and third flight possible areas 41 and 51 as one flight possible area and calculates the area of a flight possible area including the second and third flight possible areas 41 and 51.

The forcible movement control section 113 then forcibly moves the drone 10 toward the largest one of the plurality of flight possible areas 21, 41, and 51. In the example illustrated in FIG. 18, the flight possible area including the second and third flight possible areas 41 and 51 is larger than the first flight possible area 21. The forcible movement control section 113, therefore, forcibly moves the drone 10 toward either the second flight possible area 41 or the third flight possible area 51. At this time the forcible movement control section 113 forcibly moves the drone 10 toward the second flight possible area 41 or the third flight possible area 51, whichever is closer to the drone 10.

Furthermore, in the second embodiment, the drone 10 may receive, before the first and second flight possible areas 2 and 4 are determined, an input from the operator 1 indicating whether the drone 10 is to be moved into the first flight possible area 2 or the second flight possible area 4. The input indicating whether the drone 10 is to be moved into the first flight possible area 2 or the second flight possible area 4 may be stored in the storage unit before the first and second flight possible areas 2 and 4 are determined.

Figure 19:
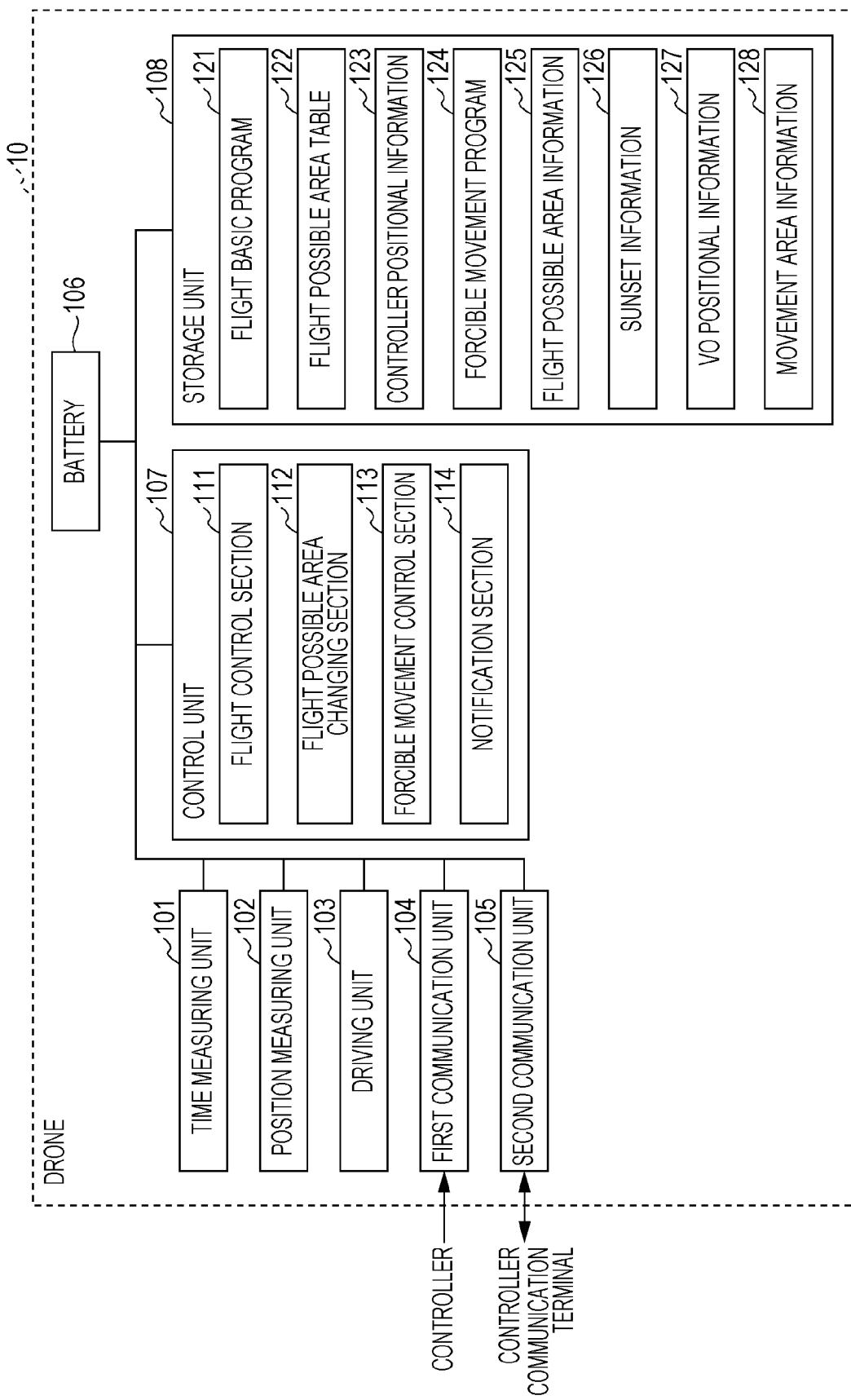
FIG. 19 is a block diagram illustrating the configuration of a drone according to a modification of the second embodiment of the present disclosure.

FIG. 19 is a block diagram illustrating the configuration of a drone 10 according to a modification of the second embodiment of the present disclosure.

The drone 10 illustrated in FIG. 19 includes the time measuring unit 101, the position measuring unit 102, the driving unit 103, the first communication unit 104, the second communication unit 105, the battery 106, the control unit 107, and the storage unit 108. In the modification of the second embodiment, description of the same components as in the first or second embodiment is omitted.

The control unit 107 includes the flight control section 111, the flight possible area changing section 112, the forcible movement control section 113, and the notification section 114.

The storage unit 108 stores the flight basic program 121, the flight possible area table 122, the controller positional information 123, the forcible movement program 124, the flight possible area information 125, the sunset information 126, the VO positional information 127, and movement area information 128.

The movement area information 128 indicates whether the drone 10 is to be moved into the first flight possible area 2 or the second flight possible area 4 when the first and second flight possible areas 2 and 4 are determined. The storage unit 108 stores the movement area information 128 in advance. For example, the controller 20 receives the movement area information 128 input from the operator 1 and transmits the received movement area information 128 to the drone 10. The second communication unit 105 receives the movement area information 128 transmitted from the controller 20 and stores the received movement area information 128 in the storage unit 108.

If the drone 10 is not located within the first flight possible area 2 or the second flight possible area 4 indicated by the movement area information 128 when the first and second flight possible areas 2 and 4 are actually determined, the forcible movement control section 113 automatically moves the drone 10 toward the first flight possible area 2 or the second flight possible area 4 stored in the storage unit 108.

The flight possible area changing section 112 reduces either the first flight possible area 2 or the second flight possible area 4 indicated by the movement area information 128 as time elapses.

If the storage unit 108 does not store the movement area information 128 in advance and the drone 10 is not located within the first flight possible area 2 or the second flight possible area 4 indicated by the movement area information 128 when the first and second flight possible areas 2 and 4 are actually determined, the forcible movement control section 113 automatically moves the drone 10 toward the controller 20 or the communication terminal 30, whichever is closer to the drone 10.

If the storage unit 108 does not store the movement area information 128 in advance and the drone 10 is not located within the first flight possible area 2 or the second flight possible area 4 indicated by the movement area information 128 when the first and second flight possible areas 2 and 4 are actually determined, the forcible movement control section 113 may automatically move the drone 10 toward the controller 20.

Furthermore, if the drone 10 is located within an area different from one indicated by the movement area information 128 when the first and second flight possible areas 2 and 4 are actually determined, the flight control section 111 may control the drone 10 such that the drone 10 flies within the area within which the drone 10 is currently located.

In addition, in the modification of the second embodiment, too, the flight control system may include the drone 10, the controller 20, the first communication terminal 31, and the second communication terminal 32. If, in FIG. 16, the storage unit 108 does not store the movement area information 128 in advance, and if the first and third flight possible areas 21 and 51 are separated from the second flight possible area 41 and the first flight possible area 21 overlaps the third flight possible area 51 when the flight possible area changing section 112 determines the first to third flight possible areas 21, 41, and 51, for example, the forcible movement control section 113 may automatically move the drone 10 toward the controller 20 or the second communication terminal 32, whichever is closer to the drone 10.

In addition, if, in FIG. 18, the storage unit 108 does not store the movement area information 128 in advance and the first flight possible area 21 is separated from the second and third flight possible areas 41 and 51 and the second flight possible area 41 overlaps the third flight possible area 51 when the flight possible area changing section 112 determines the first to third flight possible areas 21, 41, and 51, the forcible movement control section 113 may automatically move the drone 10 toward the first communication terminal 31 or the second communication terminal 32 in the largest flight possible area including the second and third flight possible areas 41 and 51, whichever is closer to the drone 10.

In addition, in the modification of the second embodiment, the controller 20 may include the time measuring unit 101, the flight possible area changing section 112, the forcible movement control section 113, the flight possible area table 122, the forcible movement program 124, the flight possible area information 125, the sunset information 126, the VO positional information 127, and the movement area information 128. In this case, the forcible movement control section 113 has a function of generating and transmitting a command for forcibly moving the drone 10. The forcible movement program 124 is used to generate and transmit a command for forcibly moving the drone 10. The flight possible area table 122, the forcible movement program 124, the flight possible area information 125, the sunset information 126, the VO positional information 127, and the movement area information 128 are stored in the storage unit of the controller 20. The storage unit also store positional information regarding the drone 10. As a result, the controller 20 can perform the processes performed by the drone 10 in the above description.

In addition, in the modification of the second embodiment, the flight control system may include the drone 10, the controller 20 and a server. The server is connected to the controller 20 through a network. The server may include the time measuring unit 101, the flight possible area changing section 112, the forcible movement control section 113, the flight possible area table 122, the forcible movement program 124, the flight possible area information 125, the sunset information 126, the VO positional information 127, and the movement area information 128. In this case, the forcible movement control section 113 has a function of generating and transmitting a command for forcibly moving the drone 10. The forcible movement program 124 is used to generate and transmit a command for forcibly moving the drone 10. The flight possible area table 122, the forcible movement program 124, the flight possible area information 125, the sunset information 126, the VO positional information 127, and the movement area information 128 are stored in a storage unit of the server. The storage unit also stores positional information regarding the drone 10. As a result, the server can perform the processes performed by the drone 10 in the above description. Information transmitted from the server may be received by the drone 10 through the controller 20, and information transmitted from the drone 10 may be received by the server through the controller 20. Alternatively, information transmitted from the server may be directly received by the drone 10, and information transmitted from the drone 10 may be directly received by the server. Information transmitted from the communication terminal 30 may be received by the server through the controller 20 or directly received by the server.

In the present disclosure, some or all of the units, the apparatuses, the members, and the sections or some of all of the functional blocks illustrated in the block diagrams of FIGS. 3, 4, 5, 12, 18, 19, and 22 may be implemented by one or a plurality of electronic circuits including a semiconductor device, a semiconductor integrated circuit (IC), or a large-scale integration (LSI) circuit. The LSI circuit or the IC may be mounted on a single chip, or may be constructed by combining a plurality of chips. For example, functional blocks other than a storage device may be integrated on a single chip. Although the terms "LSI circuit" and "IC" are used here, a term used changes depending on a degree of integration, and a circuit called a "system LSI circuit", a "very-large-scale integration (VLSI) circuit", or a "ultra-large-scale-integration (ULSI) circuit" may be used, instead. A field-programmable gate array (FPGA), which is programmed after an LSI circuit is fabricated, or a reconfigurable logic device, which is capable of reconfiguring connections inside an LSI circuit or setting circuit sections inside an LSI circuit, can be used for the same purpose.

Some or all the functions or the operations of the units, the apparatuses, the members, and the section may be implemented by a software process. In this case, software is stored in one or a plurality of non-transitory recording media such as a read-only memory (ROM), an optical disc, or a hard disk drive. When a processor executes the software, a function specified by the software is achieved by the processor and peripheral devices. A system or an apparatus may include the one or plurality of non-transitory recording media storing the software, the processor, and a necessary hardware device, such as an interface.

The drone, the method for controlling flight, the flight basic program, and the forcible movement program in the present disclosure are capable of returning the drone before an end of a time period for which the flight of the drone is permitted and effective as a drone flown by remote control, a method for controlling the flight of the drone flown by remote control, a flight basic program, and a forcible movement program, respectively.

What is claimed is:

1. A drone, comprising:
   a motor;
   a plurality of propulsion propellers;
   a plurality of sensors;
   a controller;
   a timer that measures a present time;
   a global positioning system that obtains a current position of the drone; and
   a storage that stores a time period for which flight of the drone is permitted,
   wherein the controller performs operations, including
      sequentially reducing a possible flight area of the drone in accordance with a sequence of determined differences between an end of the time period for which flight of the drone is permitted and the present time, wherein the end of the time period for which flight of the drone is permitted is sunset,
      determining whether the drone is located within the possible flight area on the basis of the current position of the drone, and
      controlling the drone to move the drone within the possible flight area.

2. The drone according to claim 1,
   wherein the operations further include moving, when it is determined that the drone is located outside the possible flight area, the drone toward a control device used to remotely control the drone.

3. The drone according to claim 1,
   wherein the operations further include changing the possible flight area at a certain time.

4. The drone according to claim 1,
   wherein the operations further include rejecting, when it is determined that the drone is located outside the possible flight area, an operation command from a control device used to remotely control the drone.

5. The drone according to claim 1,
   wherein the operations further include rejecting, when it is determined that the drone is located outside the possible flight area, an operation other than the operation for moving the drone toward a control device used to remotely control the drone.

6. A method for controlling flight of a drone, including a motor, propulsion propellers, sensors, a controller, a timer, a global positioning system, and a storage, the method comprising:
   obtaining a present time from the timer,
   obtaining a current position of the drone from the global positioning system,
   obtaining a time period, stored in the storage, for which the drone is permitted to fly,
   sequentially reducing, by the controller, a possible flight area of the drone in accordance with a sequence of determined differences between an end of the time period for which flight of the drone is permitted and the present time, wherein the end of the time period for which flight of the drone is permitted is sunset,
   determining, by the controller, whether the drone is located within the possible flight area on the basis of the current position of the drone, and
   controlling, by the controller, the drone to move the drone within the possible flight area.

7. A computer-readable non-transitory recording medium storing a program for controlling flight of a drone, including a motor, propulsion propellers, sensors, a timer, a global positioning system, a computer, and a storage, the program causing, when executed by the computer, the computer to perform operations, comprising:
   obtaining a present time by the timer,
   obtaining a current position of the drone by the global positional system,
   obtaining a time period, stored in the storage, for which flight of the drone is permitted, sequentially reducing, by the computer, a possible flight area of the drone in accordance with a sequence of determined differences between an end of the time period for which flight of the drone is permitted and the present time, wherein the end of the time period for which flight of the drone is permitted is sunset, determining, by the computer, whether the drone is located within the possible flight area on the basis of the current position of the drone, and controlling, by the computer, the drone to move the drone within the possible flight area.

8. A method for notifying a control device used to remotely control a drone, including a motor, propulsion propellers, sensors, a controller, a timer, a global positioning system, and a storage, the method comprising:

obtaining a present time from the timer, obtaining a current position of the drone by the global positioning system, obtaining a time period, from the storage, for which flight of the drone is permitted, sequentially reducing, by the controller, a possible flight area of the drone in accordance with a sequence of determined differences between an end of the time period for which flight of the drone is permitted and the present time, wherein the end of the time period for which flight of the drone is permitted is sunset, notifying, by the controller, the control device that the flight possible area has been determined, and controlling, by the controller, the drone to move the drone within the possible flight area.

9. The method according to claim 8, wherein notifying includes notifying the control device that the possible flight area is to be determined before a determined possible flight area is set.

10. The method according to claim 8, wherein notifying includes notifying the control device that the drone is to be moved toward the control device when it is determined that the drone is located outside the possible flight area.

11. A computer-readable, non-transitory recording medium storing a program for notifying a control device used to remotely control a drone, including a motor, propulsion propellers, sensors, a computer, a timer, a global positioning system, and a storage, the program causing, when executed by the computer, the computer to perform operations, comprising:

obtaining a present time from the timer, obtaining a current position of the drone from the global positioning system, obtaining a time period, from the storage, for which flight of the drone is permitted, sequentially reducing, by the computer, a possible flight area of the drone in accordance with a sequence of determined differences between an end of the time period for which flight of the drone is permitted and the present time, wherein the end of the time period for which flight of the drone is permitted is sunset, notifying, by the computer, the control device that the possible flight area has been determined, and controlling, by the computer, the drone to move the drone within the possible flight area.

12. The drone according to claim 1, wherein the storage stores sunset information for which flight of the drone is permitted.

\* \* \* \* \*